(12) United States Patent
Park et al.

(10) Patent No.: US 12,380,414 B2
(45) Date of Patent: Aug. 5, 2025

(54) METHOD AND APPARATUS FOR REMITTANCE SERVICE

(71) Applicant: KAKAO CORP., Jeju-si (KR)

(72) Inventors: Young Min Park, Seongnam-si (KR); Jee Won You, Seongnam-si (KR); Soo Bum Kim, Seongnam-si (KR); Eung Ju Park, Seongnam-si (KR); Yoo Hyuk Lim, Seongnam-si (KR); Gi Young Nam, Seongnam-si (KR); Gi Woo Kang, Seongnam-si (KR); Sang Woo Lee, Seongnam-si (KR)

(73) Assignee: KAKAO CORP., Jeju-Si (KR)

( * ) Notice: Subject to any disclaimer, the term of this patent is extended or adjusted under 35 U.S.C. 154(b) by 242 days.

(21) Appl. No.: 18/090,485

(22) Filed: Dec. 29, 2022

(65) Prior Publication Data

US 2023/0214800 A1 Jul. 6, 2023

(30) Foreign Application Priority Data

Dec. 31, 2021 (KR) .................. 10-2021-0193887
Dec. 31, 2021 (KR) .................. 10-2021-0194085

(51) Int. Cl.
*G06Q 20/38* (2012.01)
*G06Q 20/10* (2012.01)
*G06Q 20/40* (2012.01)

(52) U.S. Cl.
CPC .......... *G06Q 20/10* (2013.01); *G06Q 20/383* (2013.01); *G06Q 20/4014* (2013.01)

(58) Field of Classification Search
CPC ... G06Q 20/10; G06Q 20/383; G06Q 20/4014
See application file for complete search history.

(56) References Cited

U.S. PATENT DOCUMENTS 7,308,413 B1 * 12/2007 Tota ............... G06Q 10/063
                                                   705/7.11
2002/0120563 A1    8/2002   McWilliam et al.
(Continued)

FOREIGN PATENT DOCUMENTS

CN         106096927 A     11/2016
CN         109863528 A      6/2019
(Continued)

OTHER PUBLICATIONS

Oct. 26, 2023—(KR) Office Action—App 20210193887—Eng Tran.
(Continued)

*Primary Examiner* — Peter D Nolan
*Assistant Examiner* — Matthew Cobb
(74) *Attorney, Agent, or Firm* — Banner & Witcoff, Ltd.

(57) ABSTRACT

A method and apparatus for a remittance service are disclosed. An operation method of a server providing a remittance service includes receiving, from a remitter participating in an anonymous chatroom by using a first temporary profile, a request for a remittance to a second temporary profile participating in the anonymous chatroom, verifying a remittance qualification of an account of the remitter, generating remittance transaction information for remitting an amount corresponding to the remittance request to an account of a remittee corresponding to the second temporary profile, and transmitting, to the account of the remittee a remittance notification including information on the first temporary profile as remitter information.

16 Claims, 21 Drawing Sheets

(56) References Cited

U.S. PATENT DOCUMENTS

| | | | | |
|---|---|---|---|---|
| 2011/0119190 A1* | 5/2011 | Mina | .................... | G06Q 20/383 |
| | | | | 705/44 |
| 2016/0125371 A1* | 5/2016 | Grassadonia | ........ | G06Q 20/405 |
| | | | | 705/44 |

FOREIGN PATENT DOCUMENTS

| | | |
|---|---|---|
| CN | 106557920 B | 1/2021 |
| CN | 113095804 A | 7/2021 |
| JP | 2010-108177 A | 5/2010 |
| JP | 2017-058808 A | 3/2017 |
| JP | 2019-508767 A | 3/2019 |
| JP | 2020-096244 A | 6/2020 |
| JP | 2021-117906 A | 8/2021 |
| KR | 10-2014-0094801 A | 7/2014 |
| KR | 10-1654261 B1 | 9/2016 |
| KR | 10-2017-0141930 A | 12/2017 |
| KR | 10-2019-0115652 A | 10/2019 |
| KR | 10-2020-0009159 A | 1/2020 |
| KR | 10-2021-0022966 A | 3/2021 |
| TW | 201939389 A | 10/2019 |
| TW | 201942831 A | 11/2019 |

OTHER PUBLICATIONS

Oct. 26, 2023—(KR) Office Action—App 20210194085—Eng Tran.
Dec. 5, 2023—(JP) Office Action—App No. 2022-211497—Eng Tran.
Dec. 5, 2023—(TW) Office Action—App 111150929—Eng Tran.

* cited by examiner

METHOD AND APPARATUS FOR REMITTANCE SERVICE

CROSS-REFERENCE TO RELATED APPLICATION(S)

This application claims the priority benefit of Korean Patent Application No. 10-2021-0194085 filed on Dec. 31, 2021, and Korean Patent Application No. 10-2021-0193887 filed on Dec. 31, 2021, in the Korean Intellectual Property Office, the disclosures of which are incorporated herein by reference for all purposes.

BACKGROUND

1. Field

One or more embodiments relate to a method and apparatus for a remittance service, and more particularly, to a server for providing a remittance service and a client using the remittance service.

2. Description of Related Art

Financial technology (FinTech) is a compound word of finance and technology and refers to financial services and industries based on information technology, including mobile, big data, social networking services (SNS), and the like. Various financial services using FinTech have emerged. Financial services are different from existing financial services and include mobile banking, app cards, and the like. With the recent expansion of FinTech services, a user may directly deal with banking activities, such as transfers or deposits, by using a computer or a mobile device without visiting a bank, and online remittance services are widely used. The use of an official authentication certificate or the exchange of personal information, such as a name of a remittee, a bank name of the remittee, and an account number of the remittee, and the like, was necessary for using online remittance services, but recently, technologies for providing convenient online remittance services have been actively developed, for example, by simplifying an authentication process or by simplifying information necessary for a remittance transaction.

SUMMARY

An aspect provides technology for enabling remittance between participants in an anonymous chatroom.

However, technical aspects are not limited to the foregoing aspect, and there may be other technical aspects.

According to an aspect, there is provided an operation method of a server providing a remittance service including receiving, from a remitter participating in an anonymous chatroom, provided by the server, by using a first temporary profile, a request for a remittance to a second temporary profile participating in the anonymous chatroom; verifying a remittance qualification of an account of the remitter, based on authentication information of the account of the remitter; generating remittance transaction information, based on the remittance qualification of the account of the remitter, for remitting an amount corresponding to the remittance request to an account of a remittee corresponding to the second temporary profile; and transmitting, to the account of the remittee, based on the remittance transaction information, a remittance notification including information on the first temporary profile as remitter information.

The generating the remittance transaction information may include generating the remittance transaction information when the remittance qualification of the account of the remitter is verified and requesting the remitter for identity authentication to obtain a remittance qualification when the remittance qualification of the account of the remitter is not verified.

The generating the remittance transaction information may include verifying a receipt qualification of the account of the remittee, based on authentication information of the account of the remittee and generating the remittance transaction information, further based on whether the receipt qualification of the account of the remittee is verified.

The generating the remittance transaction information, further based on whether the receipt qualification of the account of the remittee is verified, may include generating the remittance transaction information when the receipt qualification of the account of the remittee is verified and transmitting, to the account of the remitter, a remittance failure notification when the receipt qualification of the account of the remittee is not verified.

The receiving the request for the remittance may include providing a terminal of the remitter, through the anonymous chatroom, with a remittance interface for the remittance request and receiving an input for the remittance request from the terminal of the remitter through the remittance interface.

The input for the request for a remittance may include an input of a remittance amount and an input of selecting, as a remittee, the second temporary profile from among at least one temporary profile participating in the anonymous chatroom.

The providing the remittance interface may include classifying temporary profiles into a first type and a second type and displaying a temporary profile of the first type and a temporary profile of the second type, in which the first-type temporary profile corresponds to an account including authentication information and the second-type temporary profile corresponds to an account not including authentication information among anonymous profiles participating in the anonymous chatroom.

The providing the remittance interface may include deactivating an input of selecting, as a remittee, a second-type temporary profile corresponding to an account not including authentication information from among anonymous profiles participating in the anonymous chatroom.

The operation method may further include transmitting, to the account of the remitter, a remittance notification including information on the second temporary profile as remittee information.

The operation method may further include receiving a receipt request from the account of the remittee, based on the remittance notification transmitted to the account of the remittee; verifying a receipt qualification of the account of the remittee, based on authentication information of the account of the remittee; and processing a remittance transaction corresponding to the receipt request, based on whether the receipt qualification of the account of the remittee is verified.

The processing the remittance transaction may include processing the remittance transaction when the receipt qualification of the account of the remittee is verified and requesting the remittee for identity authentication to obtain a receipt qualification when the receipt qualification of the account of the remittee is not verified.

The operation method may further include transmitting, to the account of the remittee, based on the remittance transaction corresponding to the receipt request, a receipt notification including information on the first temporary profile as remitter information.

The operation method may further include transmitting, to the account of the remitter, based on the remittance transaction corresponding to the receipt request, a receipt notification including information on the second temporary profile as remittee information.

The remittance transaction information may include an identifier of a remittee corresponding to the remittance request and an identifier of a remittance transaction corresponding to the remittance request.

The account of the remitter may include an account generated when the remitter subscribes for the remittance service.

The account of the remittee may include an account generated when the remittee subscribes for the remittance service.

According to another aspect, there is provided an operation method of a client to use a remittance service provided by a server including requesting the server for a remittance qualification, based on whether an account subscribing for the remittance service is authenticated, through an anonymous chatroom in which the client participates; selecting, as a remittee, at least one temporary profile from among temporary profiles participating in the anonymous chatroom; and requesting a remittance to the temporary profile, based on a receipt qualification of a participant corresponding to the temporary profile selected as the remittee.

According to another aspect, there is provided a server providing a remittance service including at least one processor configured to receive, from a remitter participating in an anonymous chatroom, provided by the server, by using a first temporary profile, a request for a remittance to a second temporary profile participating in the anonymous chatroom, verify a remittance qualification of an account of the remitter, based on authentication information of the account of the remitter, generate remittance transaction information, based on the remittance qualification of the account of the remitter, for remitting an amount corresponding to the remittance request to an account of a remittee corresponding to the second temporary profile, and transmit, to the account of the remittee, based on the remittance transaction information, a remittance notification including information on the first temporary profile as remitter information.

The processor, in generating the remittance transaction information, may generate the remittance transaction information when the remittance qualification of the account of the remitter is verified and request the remitter for identity authentication to obtain a remittance qualification when the remittance qualification of the account of the remitter is not verified.

The processor may receive a receipt request from the account of the remittee, based on the remittance notification transmitted to the account of the remittee, verify a receipt qualification of the account of the remittee, based on authentication information of the account of the remittee, and process a remittance transaction corresponding to the receipt request, based on whether the receipt qualification of the account of the remittee is verified.

According to another aspect, there is provided a client to use a remittance service provided by a server including at least one processor configured to request the server for a remittance qualification, based on whether an account subscribing for the remittance service is authenticated, through an anonymous chatroom in which the client participates, select, as a remittee, at least one temporary profile from among temporary profiles participating in the anonymous chatroom, and request a remittance to the temporary profile, based on a receipt qualification of a participant corresponding to the temporary profile selected as the remittee.

According to another aspect, there is provided a method of providing a remittance service by a messaging server, by interoperating with a remittance server, providing a messaging service, including receiving, from a remitter participating in an anonymous chatroom by using a first temporary profile, a request for a remittance to a second temporary profile participating in the anonymous chatroom; transmitting the remittance request to the remittance server, based on whether an account of the remitter is qualified for the remittance; receiving, from the remittance server, remittance transaction information including an identifier of the second temporary profile as a remittee; and transmitting a remittance notification message to an account of a remittee mapped to the identifier of the second temporary profile, based on the remittance transaction information.

The method may further include generating a temporary profile, which depends on the anonymous chatroom, corresponding to each participant of the anonymous chatroom and mapping an identifier of the temporary profile corresponding to each participant to an account of each participant subscribing for the messaging service and storing the identifier.

The method may further include transmitting, to the account of the remitter, a remittance notification message including information on the second temporary profile as remittee information.

The receiving the request for the remittance may include providing a terminal of the remitter, through the anonymous chatroom, with a remittance interface for the remittance request and receiving an input for the remittance request from the terminal of the remitter through the remittance interface.

The input for the request for a remittance may include an input of a remittance amount and an input of selecting, as a remittee, the second temporary profile from among at least one temporary profile participating in the anonymous chatroom.

The method may further include transmitting, to the account of the remitter, a remittance notification message including information on the second temporary profile as remittee information.

The remittance notification message may include, as remitter information, information on the first temporary profile.

The remittance transaction information may include an identifier of a remittee corresponding to the remittance request and an identifier of a remittance transaction corresponding to the remittance request.

The account of the remitter may include an account generated when the remitter subscribes for the messaging service.

The account of the remittee may include an account generated when the remittee subscribes for the messaging service.

According to another aspect, there is provided an operation method of a client to use a remittance service provided by a messaging server, by interoperating with a remittance server, including requesting the messaging server for a remittance qualification, based on whether an account subscribing for the messaging service is authenticated, through an anonymous chatroom in which the client participates; selecting, as a remittee, at least one temporary profile from among temporary profiles participating in the anonymous chatroom; and requesting a remittance to the temporary profile selected as the remittee.

The requesting the remittance may include requesting a remittance to the temporary profile, based on a receipt qualification of a participant corresponding to the temporary profile selected as the remittee.

According to another aspect, there is provided a method of providing a remittance service by a messaging server, by interoperating with a remittance server, providing a messaging service, including receiving, from the remittance server, a remittee verification request corresponding to a request for remittance receipt through an anonymous chatroom; verifying whether an account requesting the remittance server for the remittance receipt is the same user as an identifier of a remittee included in the request for remittance receipt, based on mapping information of accounts of participants and identifiers of temporary profiles of the participants that depend on the anonymous chatroom; and transmitting a verification result to the remittance server.

The method may further include receiving the request for remittance receipt from an account of the remittee, based on a remittance notification message transmitted to the account of the remittee and transmitting the request for remittance receipt to the remittance server, based on whether the account of the remittee is qualified for receipt.

The method may further include receiving, from the remittance server, a processing result of the request for remittance receipt and transmitting a receipt notification message to an account requesting the remittance receipt in response to the processing result.

The method may further include receiving, from the remittance server, a processing result of the request for remittance receipt and transmitting a receipt notification message to an account requesting the remittance in response to the processing result.

According to another aspect, there is provided a messaging server providing a remittance service by interoperating with a remittance server, the messaging server including at least one processor configured to receive, from a remitter participating in an anonymous chatroom by using a first temporary profile, a request for a remittance to a second temporary profile participating in the anonymous chatroom, transmit the request for the remittance to the remittance server, based on whether an account of the remitter is qualified for the remittance, receive, from the remittance server, remittance transaction information including an identifier of the second temporary profile as a remittee, and transmit a remittance notification message to an account of a remittee mapped to the identifier of the second temporary profile, based on the remittance transaction information.

The processor may generate a temporary profile, which depends on the anonymous chatroom, corresponding to each participant of the anonymous chatroom and map an identifier of the temporary profile corresponding to each participant to an account of each participant subscribing for the messaging service and store the identifier.

The processor may transmit, to the account of the remitter, a remittance notification message including information on the second temporary profile as remittee information.

According to another aspect, there is provided a client to use a remittance service provided by a messaging server, by interoperating with a remittance server, including at least one processor configured to request the messaging server for a remittance qualification, based on whether an account subscribing for the messaging service is authenticated, through an anonymous chatroom in which the client participates, select, as a remittee, at least one temporary profile from among temporary profiles participating in the anonymous chatroom, and request a remittance to the temporary profile selected as the remittee.

The processor, in requesting the remittance, may request a remittance to the temporary profile, based on a receipt qualification of a participant corresponding to the temporary profile selected as the remittee.

According to another aspect, there is provided a messaging server providing a remittance service by interoperating with a remittance server including at least one processor configured to receive, from the remittance server, a remittee verification request corresponding to a request for remittance receipt through an anonymous chatroom, verify whether an account requesting the remittance server for the remittance receipt is the same user as an identifier of a remittee included in the request for remittance receipt, based on mapping information of accounts of participants and identifiers of temporary profiles of the participants that depend on the anonymous chatroom, and transmit a verification result to the remittance server.

The processor may receive the request for remittance receipt from an account of the remittee, based on a remittance notification message transmitted to the account of the remittee and transmit the request for remittance receipt to the remittance server, based on whether the account of the remittee is qualified for receipt.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
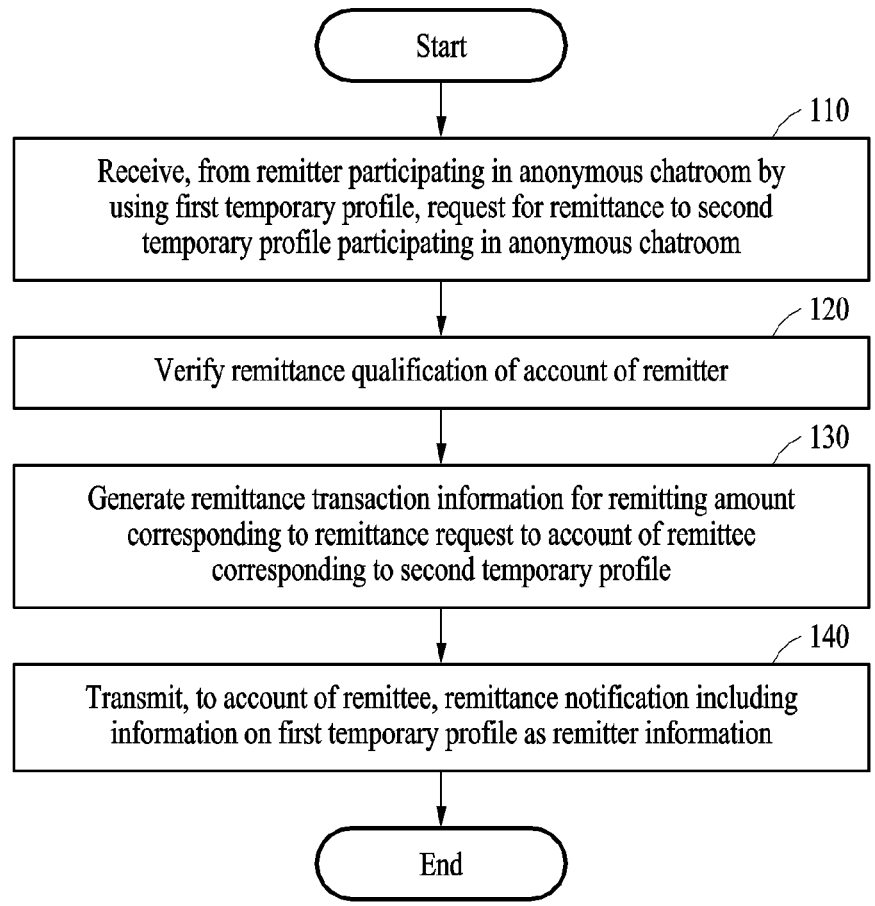
FIG. 1 is a flowchart illustrating an operation method of a server providing a remittance service, according to an embodiment.

The following detailed structural or functional description is provided as an example only and various alterations and modifications may be made to embodiments. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like elements and a repeated description related thereto is omitted.

FIG. 1 is a flowchart illustrating an operation method of a server providing a remittance service, according to an embodiment.

Referring to FIG. 1, the operation method of the server providing a remittance service may include receiving, from a remitter participating in an anonymous chatroom by using a first temporary profile, a request for a remittance to a second temporary profile participating in the anonymous chatroom in operation 110, verifying a remittance qualification of the account of the remitter in operation 120, generating remittance transaction information for remitting an amount corresponding to the remittance request to an account of a remittee corresponding to the second temporary profile in operation 130, and transmitting, to the account of the remittee, a remittance notification including information on the first temporary profile as remitter information in operation 140. More specifically, the operations described with reference to FIG. 1 may correspond to a remittance process of a remittance service performed by the server.

The server may be a server providing a remittance service and may generate and manage the accounts of users subscribing for the remittance service and provide a service of remitting and receiving a certain amount by using the accounts of the users. For example, the accounts of users may be bank accounts or online accounts, in which the online accounts store virtual electronic currencies having a certain monetary value.

The server may generate an account corresponding to a user who requests a subscription, and a client logging in to the generated account may use a service provided by the server. The client may include a terminal of a user logging in to an account of the remittance service.

The server may generate an account based on real name information of the user requesting a subscription. For example, the server may generate the account of the user, based on authenticated real name information of the user requesting a subscription and/or a mobile phone number under the real name of the user requesting the subscription. Accounts may be a unit for identifying, by a server, a user subscribing for a service.

According to an embodiment, a remitter may mean a client requesting a server for a remittance and a remittee may mean a client designated by the remitter as a recipient of the requested remittance. An account of the remitter may include an account generated when the remitter subscribes for the remittance service provided by the server and an account of the remittee may include an account generated when the remittee subscribes for the remittance service provided by the server.

Operation 110 may include receiving, from a remitter participating in an anonymous chatroom provided by the server by using a first temporary profile, a request for a remittance to a second temporary profile participating in the anonymous chatroom.

The server may provide an anonymous chatroom service to a client. The anonymous chatroom may be a chatroom in which the client participates by using a temporary profile, not a real-name-based account. For example, the anonymous chatroom service may include an open chat service provided by Kakao, that is, the applicant of the present disclosure, and more specifically, a non-acquaintance-based open chat service provided by a KakaoTalk application of the applicant of the present disclosure. The anonymous chatroom may mean a chatroom of the open chat service provided by Kakao, that is, the applicant of the present disclosure. The open chat service provided by Kakao is an example of the anonymous chatroom service, and examples are not limited thereto. The anonymous chatroom service may include a service providing a chatroom in which a user participates by using a temporary profile, not a real-name-based account. The anonymous chatroom may include a form of a 1:1 chatroom or a form of a group chatroom including two or more users as participants.

The temporary profile may be a profile temporarily assigned to the account of the user and may include, as identification information, a temporary name input by the user or a name temporarily generated by the server, not a real name. In other words, the anonymous chatroom may be a chatroom in which a user may participate by using a temporarily generated profile without exposing an account based on the real name of the user. The anonymous chatroom may be used for a chat between users who do not share their accounts, which is different from a general chatroom for a chat between users who know their accounts. A participant in an anonymous chatroom may be displayed as a temporary profile to another participant in the anonymous chatroom and may transmit and receive messages in the anonymous chatroom by using the temporary profile.

According to an embodiment, a temporary profile may be generated depending on an anonymous chatroom. For example, when a user participates in a certain anonymous chatroom, a temporary profile may be generated to display the user in the anonymous chatroom, and when the anonymous chatroom is terminated or the user leaves the anonymous chatroom, the temporary profile may be deleted. In another example, a first temporary profile of a first user account generated corresponding to a first anonymous chatroom and a second temporary profile of the first user account generated corresponding to a second anonymous chatroom may be temporary profiles different from each other.

The server may generate a temporary profile, which depends on the anonymous chatroom, corresponding to each participant of the anonymous chatroom and map an identifier of the temporary profile corresponding to each participant to an account of each participant subscribing for a messaging service and store the mapped identifier. The identifier of the temporary profile may be an identifier specifying a temporary profile and may be an identifier of a type different from the account of the user. The server may map a temporary profile, generated to participate in an anonymous chatroom, of a user to an account, subscribing for a messaging service, of the user and may store the mapped temporary profile. When a user participates in anonymous chatrooms, temporary profiles respectively corresponding to the anonymous chatrooms may be generated, and identifiers of the temporary profiles may be mapped to an account of the user and the mapped identifiers may be stored. The identifier of the temporary profile may further include information to identify an anonymous chatroom on which the temporary profile depends. For example, based on the identifier of the temporary profile, the anonymous chatroom on which the temporary profile depends may be identified.

According to an embodiment, a remittance request may include information necessary for remittance. For example, the remittance request may include a remittee identifier and a remittance amount. The remittee identifier may include an identifier of the second temporary profile participating in an anonymous chatroom. The second temporary profile may be a temporary profile designated by a remitter as a remittee of the remittance request. According to an embodiment, the remittance request may further include a remitter identifier. The remitter identifier may be information on a client transmitting the remittance request, for example, which may include an account of a user transmitting the remittance request.

According to an embodiment, the server may recognize the account of the user transmitting the remittance request as an account of a remitter and may recognize an account mapped to the identifier of the second temporary profile included in the remittance request as an account of a remittee. Because a client of the remitter knows the account of the client, the account of the remitter may be transmitted as information of the client transmitting the remittance request to the server.

According to an embodiment, the remittance request may be received through an anonymous chatroom. For example, operation 110 of receiving a remittance request may include providing a terminal of the remitter, through the anonymous chatroom, with a remittance interface for the remittance request and receiving an input for the remittance request from the terminal of the remitter through the remittance interface. For example, the input for the remittance request may include an input of a remittance amount and an input of selecting, as a remittee, the second temporary profile from among at least one temporary profile participating in the anonymous chatroom. In other words, the server may provide the remittance interface through the anonymous chatroom, and the remitter may request the server for a remittance through the remittance interface and may input information, such as a remittee and a remittance amount, for the remittance request.

For example, the operation of providing the remittance interface may include classifying temporary profiles into a first type and a second type and displaying a temporary profile of the first type and a temporary profile of the second type, in which the first-type temporary profile corresponds to an account including authentication information and the second-type temporary profile corresponds to an account not including authentication information among anonymous profiles participating in the anonymous chatroom. In another example, the operation of providing the remittance interface may include deactivating an input of selecting, as a remittee, the second-type temporary profile corresponding to an account not including authentication information from among anonymous profiles participating in the anonymous chatroom. The remittance interface is described in detail below.

Operation 120 may include verifying a remittance qualification of the account of the remitter, based on authentication information of the account of the remitter. The remittance qualification may be a qualification required to request a remittance through an anonymous chatroom, and more specifically, a qualification required to request a remittance by designating, as a remittee, a temporary profile, not account information. The remittance qualification may be determined by whether the account of the remitter is authenticated. For example, when the account of the remitter is an identity-authenticated account or the account has a certificate, on identity authentication, issued by the server, the account is determined to have a remittance qualification.

According to an embodiment, an account of a subscribing user may perform identity authentication through the server in a predetermined method. The server may store authentication information (e.g., a certificate) according to the identity authentication of a subscribing user account and determine whether an account of a user is identity-authenticated based on the stored authentication information. When authentication information corresponding to the account of the remitter is stored, the server may determine that the account of the remitter has a remittance qualification.

Operation 130 may include generating remittance transaction information, based on the remittance qualification of the account of the remitter, in order to remit an amount corresponding to the remittance request to an account of a remittee corresponding to the second temporary profile.

Figure 2A:
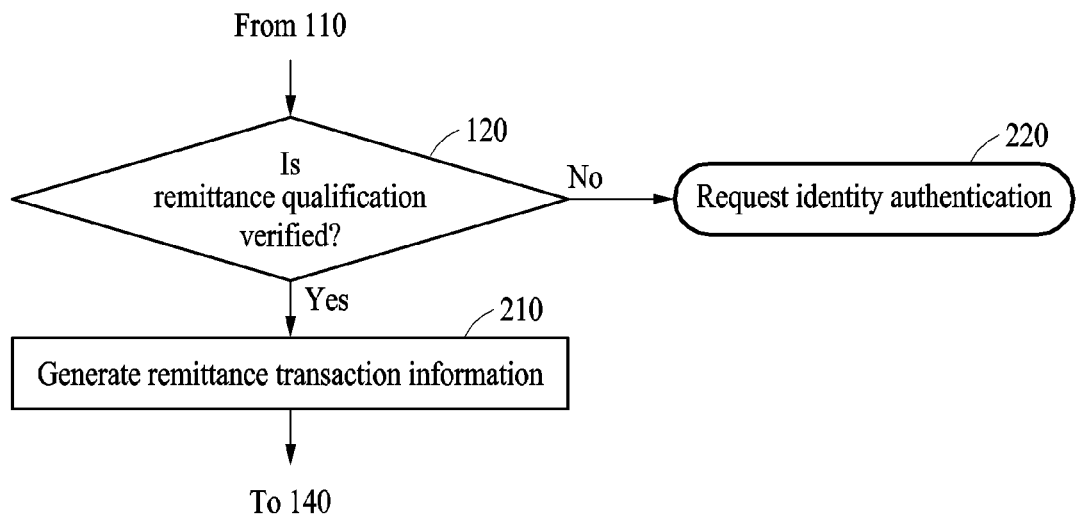
FIGS. 2A and 2B are diagrams each illustrating generating remittance transaction information, based on a remittance qualification and a receipt qualification, according to an embodiment.

For example, referring to FIG. 2A, the operation (e.g., operation 130 of FIG. 1) of generating the remittance transaction information may include operation 210 of generating the remittance transaction information when the remittance qualification of the account of the remitter is verified and operation 220 of requesting the remitter for identity authentication to obtain a remittance qualification when the remittance qualification of the account of the remitter is not verified. For example, the account of the remitter may perform identity authentication through the server in a predetermined method, based on the identity authentication request of the server in operation 220. When the identity authentication of the account of the remitter is normally performed through operation 220, a remittance qualification is obtained, and thus, the server may generate the remittance transaction information in operation 210.

According to an embodiment, the remittance transaction information may include a remittee identifier corresponding to the remittance request and a remittance transaction identifier corresponding to the remittance request. The remittance transaction identifier may be an identifier assigned to each remittance transaction unit for the server to classify remittance transactions and recognize the classified remittance transactions. The remittee identifier may be a remittee identifier included in the remittance request, that is, the identifier of the second temporary profile participating in the anonymous chatroom. For example, the remittance transaction information may further include information on a valid period of a remittance transaction. The information on the valid period of the remittance transaction may mean a valid period during which remittance receipt may be requested and may be determined based on the time when a remittance request is made or the time when the remittance request is received by the server.

According to an embodiment, a token may be generated corresponding to remittance transaction information. A token for a remittance transaction may be information needed to authenticate the remittance transaction. The server may obtain an account of a remittee that is mapped to an identifier of the second temporary profile designated as the remittee and may thus generate a token based on the account of the remittee and the identifier of the second temporary profile. The server may generate a token corresponding to an identifier of a temporary profile and an account of a user that is mapped to the identifier of the temporary profile according to the logic of generating the token. For example, the server may generate a token further based on additional information for specifying a remittance transaction, such as information on a valid period of receipt according to the time when a remittance request is received. The token that is generated further based on the information on the valid period of receipt may be used to verify a valid period of remittance receipt by the server. The method of authenticating a remittance transaction by using a token is described in detail below. A token may be transmitted to a remittee together with remittance transaction information.

Referring to FIG. 1, operation 130 may further include verifying a receipt qualification of the account of the remittee, based on authentication information of the account of the remittee and generating the remittance transaction information, further based on whether the receipt qualification of the account of the remittee is verified. The receipt qualification may be a qualification required to request remittance receipt through an anonymous chatroom, and more specifically, a qualification required to receive the requested remittance by designating, as a remittee, a temporary profile, not account information. The receipt qualification may be determined by whether the account of the remittee is verified. For example, when the account of the remittee is an identity-authenticated account or the account has a certificate, on identity authentication, issued by the server, the account is determined to be qualified for receipt. In other words, the server may generate remittance transaction information only when both a remittance qualification of an account of a remitter and a receipt qualification of an account of a remittee are verified.

Figure 2B:
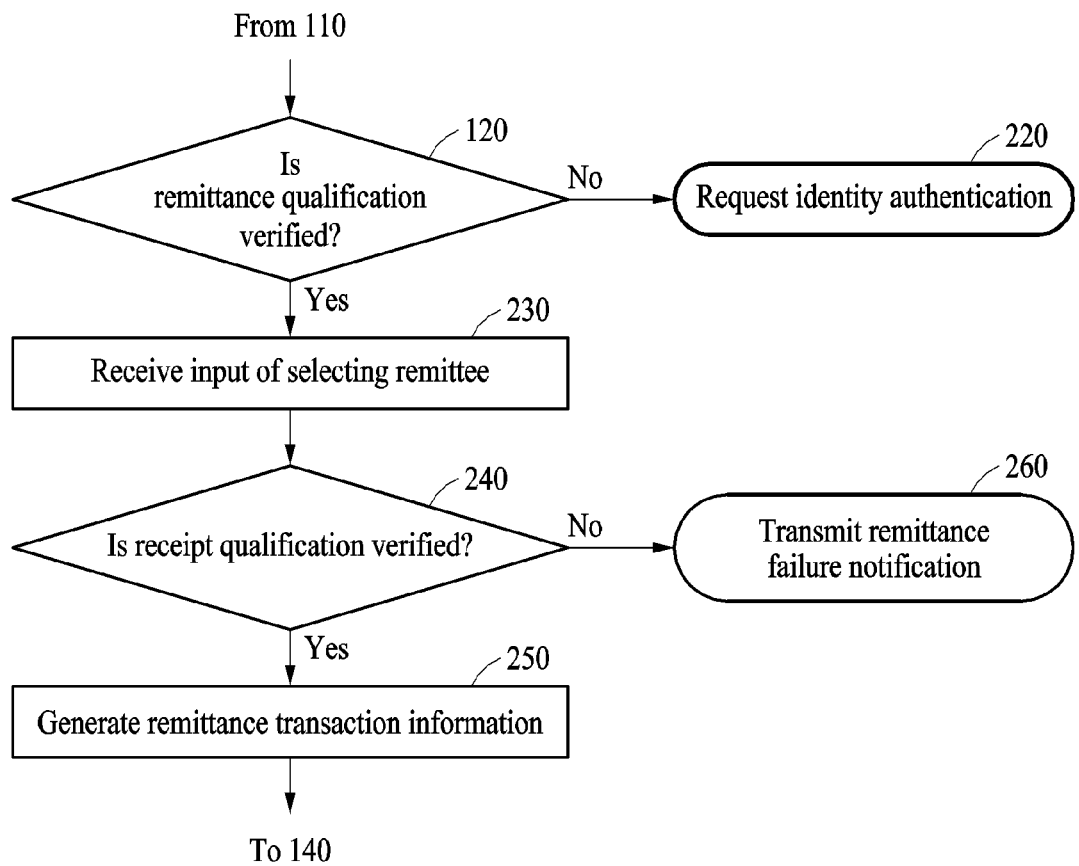

For example, referring to FIG. 2B, the server may receive, in operation 230, an input of selecting a remittee from a remitter of which a remittance qualification is verified and may verify, in operation 240, a receipt qualification of the selected remittee. For example, the input of selecting a remittee may be received in operation 230 when a remittance request is received in operation 110. Therefore, the remittance qualification of the account of the remitter may be verified in operation 120 after the input of selecting a remittee is received in operation 230. The operation of generating the remittance transaction information, further based on whether the receipt qualification of the account of the remittee is verified, may include operation 250 of generating the remittance transaction information when the receipt qualification of the account of the remittee is verified and operation 260 of transmitting, to the account of the remitter, a remittance failure notification when the receipt qualification of the account of the remittee is not verified. Operation 250 of generating the remittance transaction information may be performed only when both the remittance qualification and the receipt qualification are verified.

Operation 240 of verifying the receipt qualification of the account of the remittee may be an operation of verifying a receipt qualification of an account corresponding to a temporary profile designated as a remittee by a remitter and may be an operation performed in response to operation 230 of receiving the input of selecting a remittee from the remitter. Accordingly, when the receipt qualification of the account of the remittee is not verified, the server may provide the remitter with a remittance failure notification without requesting identity authentication to qualification verification to the remittee who has not input any request to the server for a remittance transaction.

According to an embodiment, the server may generate remittance transaction information without verifying a receipt qualification, and the verification of the receipt qualification may be performed when a receipt request is received from a remittee.

According to an embodiment, not as illustrated in FIG. 2B, the server may verify a receipt qualification of participant(s) in an anonymous chatroom first before receiving, in operation 230, an input of selecting a remittee. The server may provide a remitter with a participant qualified for receipt as being selectable and may deactivate the input of selecting a participant not qualified for receipt. This operation is described in detail below.

Operation 140, based on the remittance transaction information generated in operation 130, may include an operation of transmitting, to the account of the remittee, a remittance notification including information on the first temporary profile as remitter information. For example, the remittance notification transmitted to the remittee may include a message or a push notification. The server may obtain an account of a remittee corresponding to an identifier of a temporary profile included as a remittee identifier in the remittance transaction information and transmit a remittance notification to the account of the remittee. As described above, the server may store mapping information of an account of a user to which a temporary profile and an identifier of the temporary profile that depends on an anonymous chatroom are assigned. The server, based on the mapping information, may obtain the account of the remittee corresponding to the identifier of the temporary profile included as the remittee identifier in the remittance transaction information. The server, through a remittance notification message, may transmit, to the remittee, a token for a remittance transaction and a remittance transaction identifier included in the remittance transaction information.

According to an embodiment, the remittance notification transmitted to the account of the remittee may include information notifying the remittee that a certain amount is remitted from the remitter. The remittance notification transmitted to the remittee may include information on the first temporary profile as remitter information. The server, based on the mapping information, may obtain an identifier of the first temporary profile of the remitter, which depends on the anonymous chatroom that is mapped to the account of the remitter corresponding to a remittance request. The anonymous chatroom may be an anonymous chatroom in which the remitter and the remittee participate and may be an anonymous chatroom in which the remittance request is made by the remitter. Because accounts of participants are not exposed to each other in an anonymous chatroom, information on the first temporary profile in the anonymous chatroom may be included in the remittance notification without exposing the account of the remitter. Information on a temporary profile may include a name set in the temporary profile or a byname set in the temporary profile, regardless of the real name of a user.

According to an embodiment, a remittance notification transmitted to a remittee may include a receipt request function. For example, the remittance notification transmitted to the remittee may include an interfacing object for a receipt request. The remittee may request the remittance receipt based on the received remittance notification and may initiate a remittance receipt process. The remittance receipt process is described in detail below.

The operation method of the server may further include transmitting, to the account of the remitter, a remittance notification including information on the second temporary profile as remittee information. Based on remittance transaction information, the remittance notification may be transmitted to the account of the remitter. For example, the remittance notification transmitted to the remitter may include a message or a push notification. For example, the remittance notification transmitted to the remitter may include information notifying the remitter that a certain amount is transmitted to the remittee. Information on the remittee may be displayed as information on the second temporary profile. For example, a remittance notification may include an anonymous chatroom in which a remittance request is made. Information on an anonymous chatroom may include a name set for the anonymous chatroom in which a remitter and a remittee participate.

According to an embodiment, remittance transmission is different from remittance receipt completion, and remittance receipt may be completed when a remittance receipt process is completed after a remittee requests the receipt of the transmitted remittance.

FIGS. 3A to 3F are diagrams each illustrating a remittance interface screen according to an embodiment.

Figure 3A:
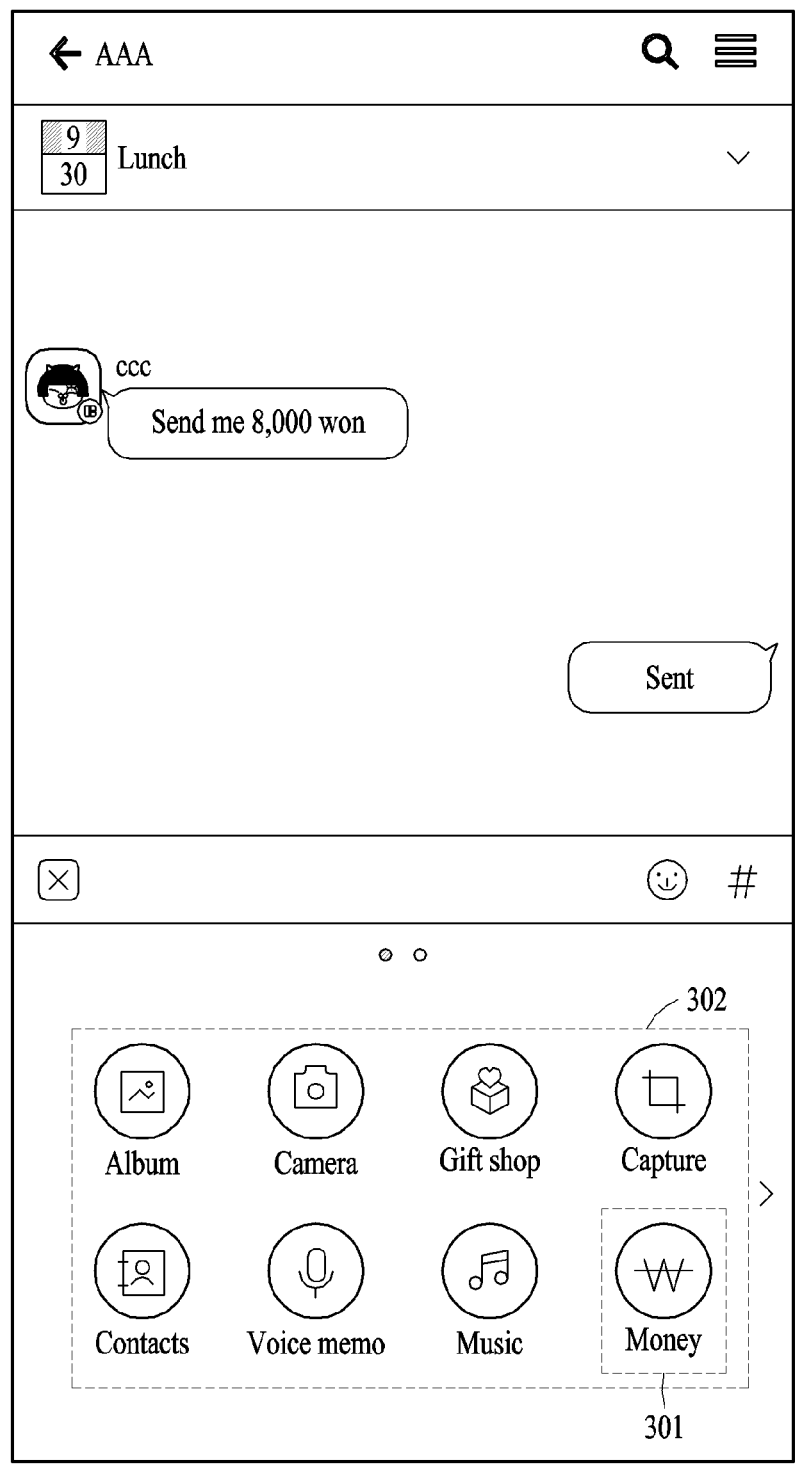
FIGS. 3A to 3F are diagrams each illustrating a remittance interface screen according to an embodiment.

Referring to FIG. 3A, provided is a remittance button 301 connected to a remittance interface through a menu tab 302 included in an interface of an anonymous chatroom. The interface of the anonymous chatroom of FIG. 3A may be switched to a remittance interface of FIG. 3B through an input of selecting the remittance button 301.

Figure 3B:
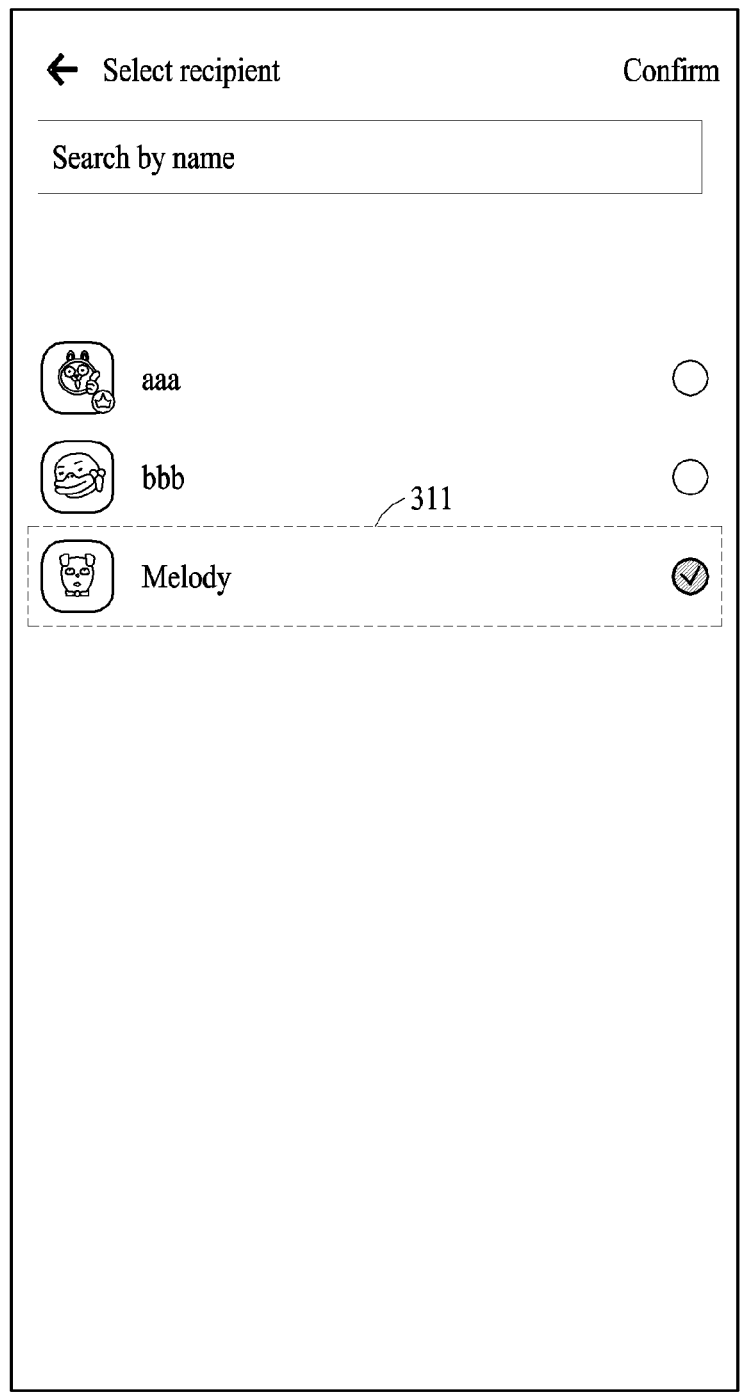

Referring to FIG. 3B, the remittance interface may display the list of temporary profiles participating in the anonymous chatroom and may include a picker for selecting, as a remittee, a temporary profile participating in the anonymous chatroom. An input of selecting at least one of the temporary profiles participating in the anonymous chatroom may be received through the remittance interface, and a selected temporary profile 311 may be designated as a recipient of remittance.

According to an embodiment, a server may classify temporary profiles into a first type and a second type and display a temporary profile of the first type and a temporary profile of the second type, in which the first-type temporary profile corresponds to an account including authentication information and the second-type temporary profile corresponds to an account not including authentication information among anonymous profiles participating in the anonymous chatroom. The account including authentication information may be an account of which identity authentication is completed through the server and the account not including authentication information may be an account of which identity authentication is not completed through the server. In other words, the first-type temporary profile may be a temporary profile of which a receipt qualification is verified and the second-type temporary profile may be a temporary profile of which a receipt qualification is not verified.

Figure 3C:
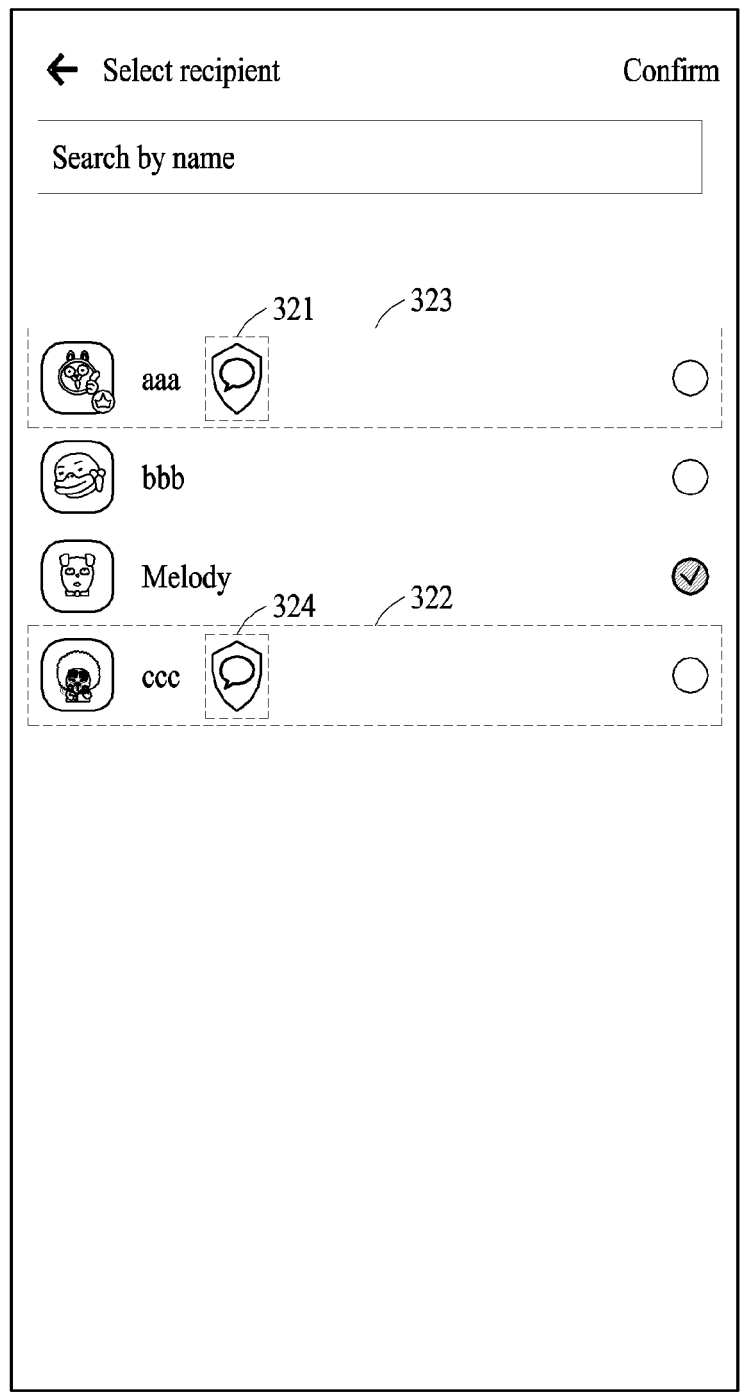

Referring to FIG. 3C, first-type temporary profiles 323 and 322 of the temporary profiles participating in the anonymous chatroom may be displayed with marks 321 and 324 indicating an authenticated profile of which a receipt qualification is verified.

Figure 3D:
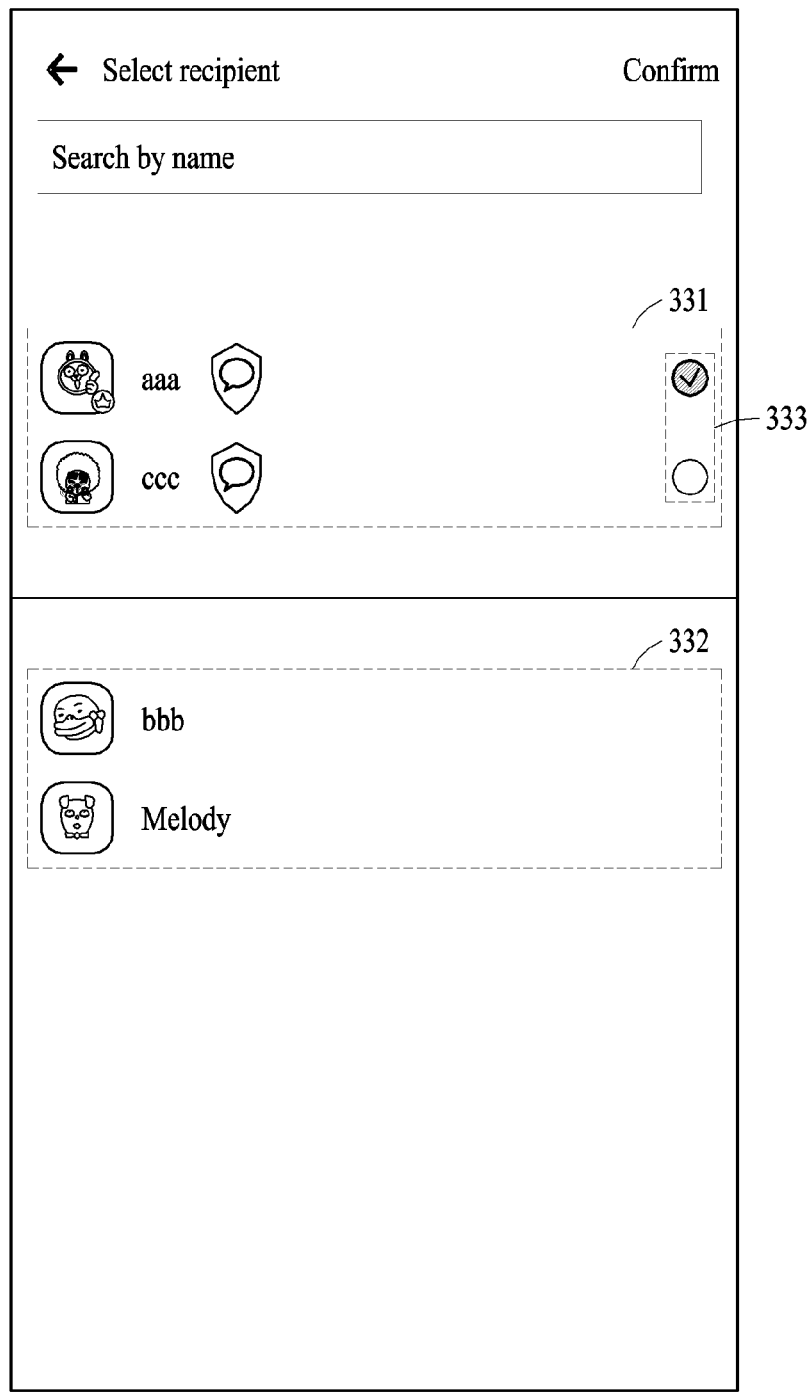

Referring to FIG. 3D, the temporary profiles participating in the anonymous chatroom may be classified according to whether qualified for receipt and be displayed in different lists 331 and 332. The server may deactivate an input of selecting a second-type temporary profile as a remittee. For example, an input of selecting a second-type temporary profile as a remittee may be deactivated by providing a picker 333 for a selection input only to the list 331 of first-type temporary profiles of which a receipt qualification is verified, not to the list 332 of second-type temporary profiles.

Figure 3E:
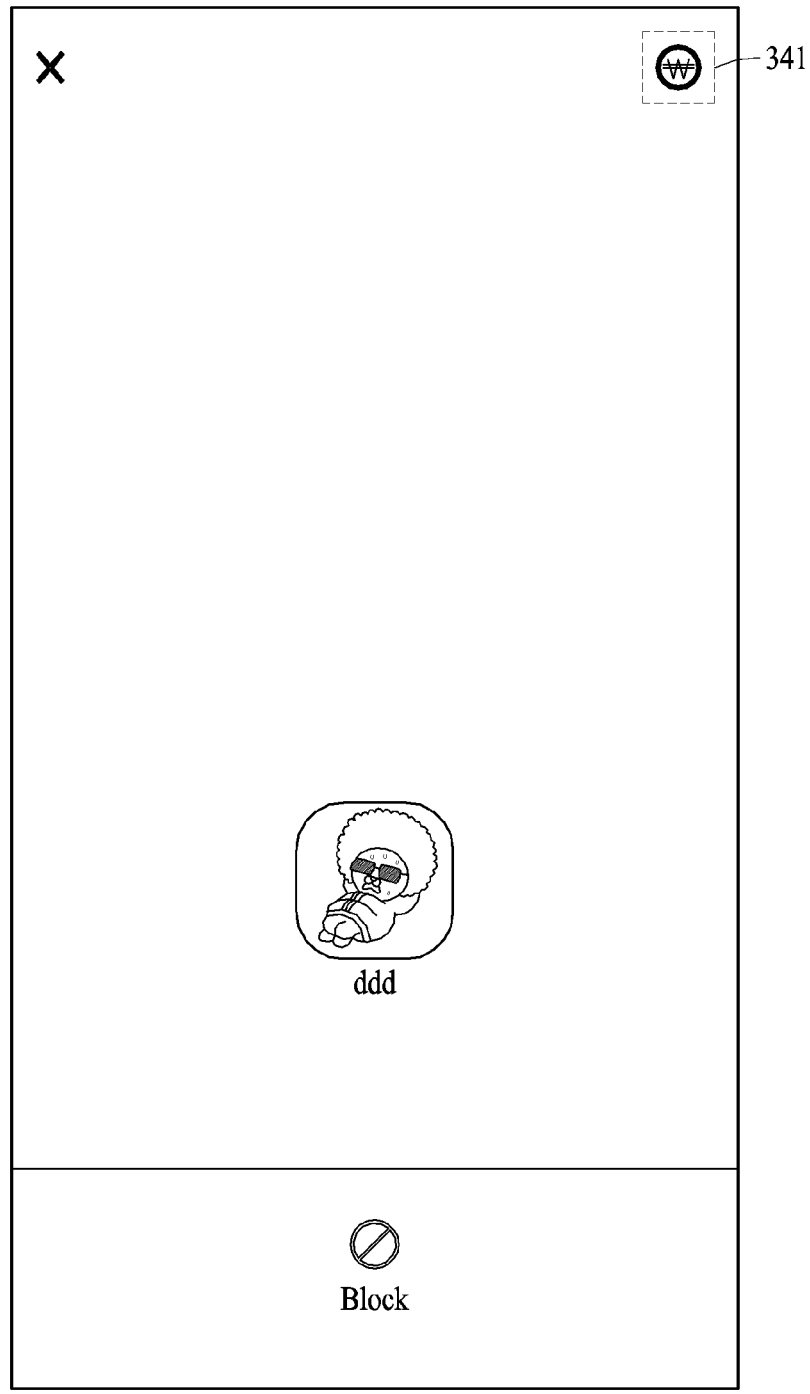
Figure 3F:
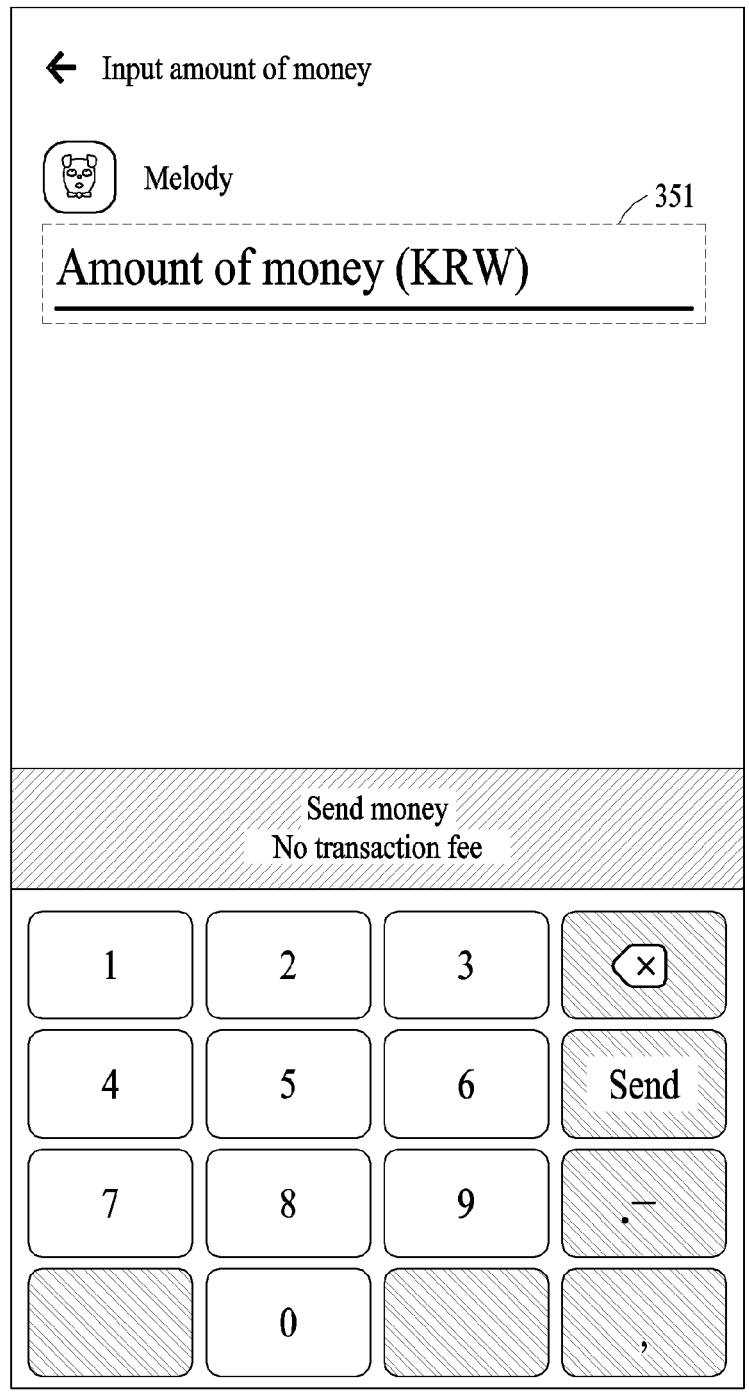

The remittance interface, of FIGS. 3B, 3C, and 3D, for selecting a remittee may be switched, through an input of selecting a remittee, to a remittance interface, of FIG. 3F, for inputting a remittance amount. Referring to FIG. 3F, the remittance interface may include an input window 341 for inputting a remittance amount.

Referring to FIG. 3E, provided is a remittance button 341 connected to the remittance interface through a temporary profile view. An interface of the temporary profile view of FIG. 3E may be switched, through an input of selecting the remittance button 341, to the remittance interface for inputting a remittance amount. When connecting to the remittance interface through the remittance button 341 included in the temporary profile view, a temporary profile corresponding to the temporary profile view may be selected as a remittee, and without a separate process of selecting a remittee, the interface of the temporary profile view may be switched to the remittance interface for inputting a remittance amount of FIG. 3F. For example, the remittance button 341 provided through the temporary profile view of FIG. 3E may be exposed or not exposed according to whether an account corresponding to the temporary profile is qualified for receipt. Specifically, when the receipt qualification of the account corresponding to the temporary profile is not verified, the remittance button 341 for a remittance request may not be exposed.

Figure 4:
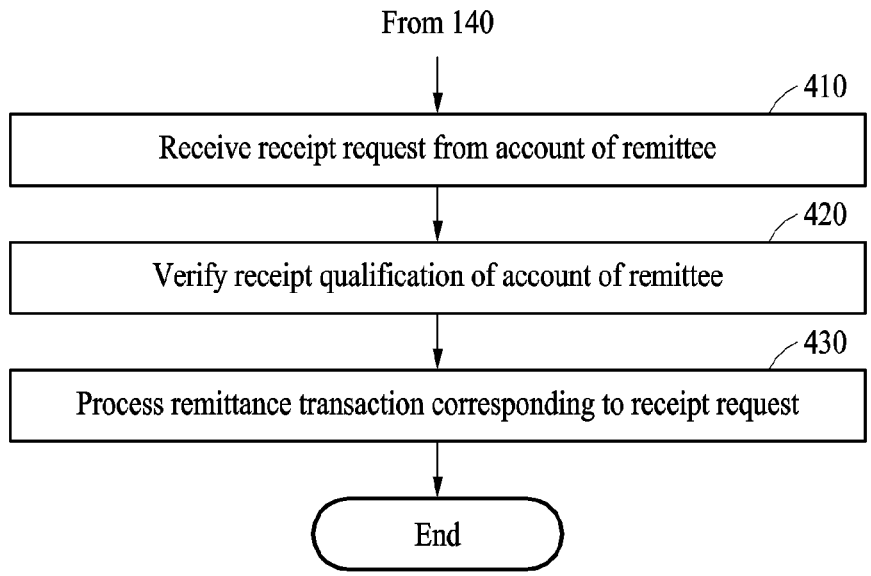
FIG. 4 is another flowchart illustrating an operation method of a server providing a remittance service, according to an embodiment.

FIG. 4 is another flowchart illustrating an operation method of a server providing a remittance service, according to an embodiment.

Referring to FIG. 4, the operation method of the server providing a remittance service may include receiving, in operation 410, a receipt request from an account of a remittee, verifying, in operation 420, a receipt qualification of the account of the remittee, and processing, in operation 430, a remittance transaction corresponding to the receipt request. For example, operations 410, 420, and 430 may be performed after operation 140 of FIG. 1.

Operation 410 may include receiving a receipt request from the account of the remittee, based on a remittance notification transmitted to the account of the remittee. The remittee may request the server for receiving a remittance through the remittance notification. The receipt request may include remittance transaction information included in the remittance notification and a token for a remittance transaction. For example, the receipt request may include a remittance transaction identifier corresponding to a remittance request, a token for a remittance transaction corresponding to the remittance request, and a remittee identifier corresponding to the remittance request.

Operation 420 may include verifying a receipt qualification of the account of the remittee, based on authentication information of the account of the remittee. The receipt qualification may be determined by whether the account of the remittee is verified. For example, when the account of the remittee is an identity-authenticated account or the account has a certificate, on identity authentication, issued by the server, the account is determined to be qualified for receipt. As described above, the verification of a receipt qualification may be performed in a receiving process separately from a remittance process and may be omitted when the receipt qualification is verified in the remittance process.

Operation 420 may further include verifying a remittance transaction based on a token for the remittance transaction. The token for the remittance transaction may be included in a receipt request. The server, based on mapping information, may obtain an account mapped to a remittee identifier included in the receipt request. The server may verify a remittance transaction by generating a token based on the remittee identifier and the obtained account and comparing whether the generated token is the same as the token included in the receipt request.

Operation 420 may further include verifying a remittance transaction based on a valid period for receiving a remittance. As described above, a token may be generated further based on information on a valid period, and the server may verify whether a remittance transaction is valid by verifying a valid period of receipt in a process of verifying the remittance transaction based on the token. Alternatively, as described above, remittance transaction information may further include a valid period of a remittance transaction, and the server may verify whether the remittance transaction is valid by verifying a valid period of the remittance transaction information included in a receipt request.

Operation 430 may include processing a remittance transaction corresponding to a receipt request, based on whether an account of a remittee is qualified for receipt. The processing of the remittance transaction may mean processing the remittance and receipt of a remittance amount from an account of a remitter to an account of a remittee, based on remittance transaction information.

Figure 5:
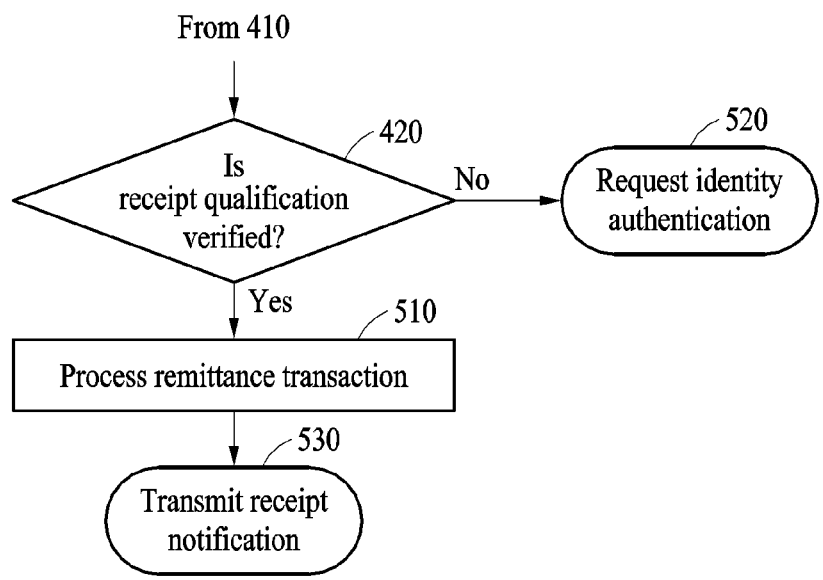
FIG. 5 is a diagram illustrating processing a remittance transaction based on a receipt qualification, according to an embodiment.

Referring to FIG. 5, an operation (e.g., operation 430 of FIG. 4) of processing a remittance transaction may include processing, in operation 510, the remittance transaction when a receipt qualification of an account of a remittee is verified and requesting, in operation 520, the remittee for identity authentication to obtain a receipt qualification when the receipt qualification of the account of the remittee is not verified. For example, the account of the remittee may perform identity authentication through the server in a predetermined method, based on an identity authentication request by the server in operation 520. When the identity authentication of the account of the remittee is normally performed in operation 520, the receipt qualification may be obtained. Therefore, the server may process the remittance transaction in operation 510.

The operation method of the server may further include transmitting, in operation 530, a receipt notification to an account of a remitter and/or an account of a remittee.

According to an embodiment, the operation method of the server may include transmitting a receipt notification including information on a first temporary profile, as remitter information, in the account of the remittee, based on the processing of a remittance transaction corresponding to the receipt request. For example, the receipt notification transmitted to the remittee may include a message or a push notification. According to an embodiment, the receipt notification transmitted to the remittee may include information notifying the remittee that the remittance from the remitter is received. The receipt notification transmitted to the remittee may include information on the first temporary profile as remitter information. Similar to a remittance notification, the receipt notification may include information on the first temporary profile corresponding to an account of the remitter without exposing the account of the remitter. For example, the receipt notification may include information on an anonymous chatroom in which a remittance request is made. The information on the anonymous chatroom may include a name set for the anonymous chatroom in which the remitter and the remittee participate.

According to an embodiment, the operation method of the server may include transmitting a receipt notification including information on a second temporary profile, as remittee information, in the account of the remitter, based on the processing of a remittance transaction corresponding to the receipt request. For example, the receipt notification transmitted to the remitter may include a message or a push notification. According to an embodiment, the receipt notification transmitted to the remitter may include information notifying the remitter that the remittance is received by the remittee. The receipt notification transmitted to the remitter may include information on the second temporary profile as remittee information. Similar to a remittance notification, the receipt notification may include information on the second temporary profile corresponding to the account of the remittee without exposing the account of the remittee. For example, the receipt notification may include information on an anonymous chatroom in which a remittance request is made. The information on the anonymous chatroom may include a name set for the anonymous chatroom in which the remitter and the remittee participate.

Figure 6:
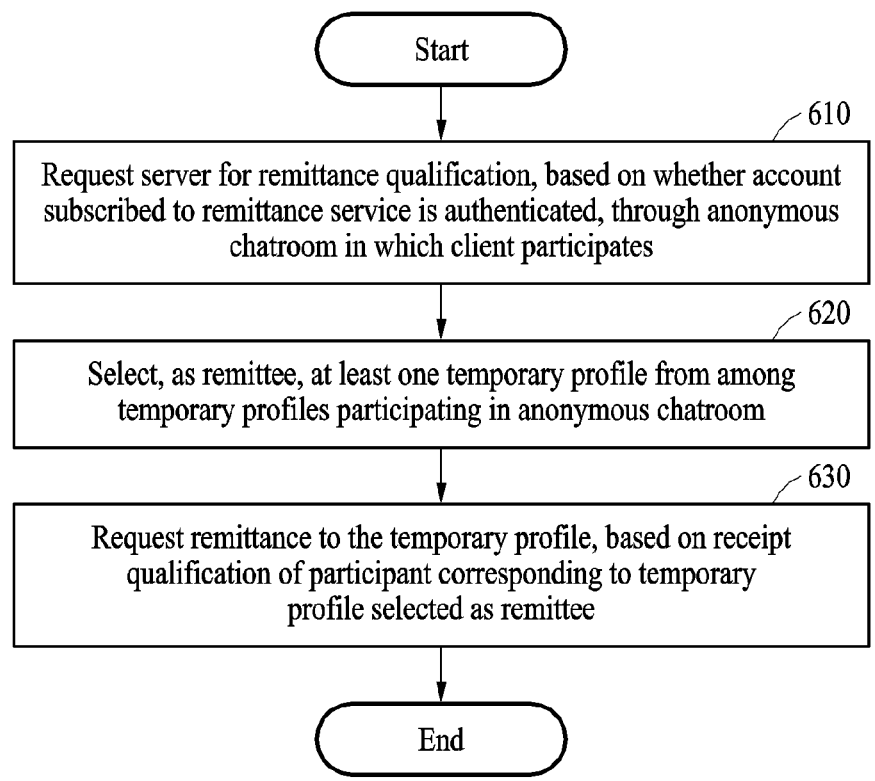
FIG. 6 is a flowchart illustrating an operation method of a client to use a remittance service provided by a server, according to an embodiment.

FIG. 6 is a flowchart illustrating an operation method of a client to use a remittance service provided by a server, according to an embodiment.

Referring to FIG. 6, the operation method of a client to use a remittance service provided by the server may include requesting, in operation 610, the server for a remittance qualification, based on whether an account subscribing for the remittance service is authenticated, through an anonymous chatroom in which the client participates, selecting, in operation 620, as a remittee, at least one temporary profile from among temporary profiles participating in the anonymous chatroom, and requesting, in operation 630, a remittance to the temporary profile, based on a receipt qualification of a participant corresponding to the temporary profile selected as the remittee. More specifically, the operations described with reference to FIG. 6 may correspond to a remittance process performed in a client corresponding to the remitter.

Operation 610 may include requesting the server for a remittance qualification when an account subscribing for a remittance service of the client is not verified. As described above, the remittance qualification may be a qualification required to request a remittance through an anonymous chatroom and may be determined based on authentication. Operation 610 may include requesting the server for authentication to obtain a remittance qualification. For example, the client may register authentication information to the server by performing identity authentication provided by the server or may obtain a remittance qualification by performing an authentication operation to obtain a certificate issued by the server. The client may perform a remittance process through an anonymous chatroom, based on the obtained remittance qualification.

Operation 620 may include selecting, by the client of which the remittance qualification is verified by the server in operation 610, at least one of temporary profiles participating in the anonymous chatroom.

Operation 630 may include requesting the server for a remittance, which designates, as a remittee, an identifier of an anonymous profile, not an account of another user. In other words, the client of which the remittance qualification is verified may request a remittance from its counterpart of which account information is not identified.

According to an embodiment, a remittance request may be transmitted to the server, based on a receipt qualification of a remittee. The server may determine the receipt qualification of the remittee, based on whether an account mapped to a temporary profile selected as the remittee is authenticated. When the receipt qualification of the remittee is verified, the remittance request may be transmitted to the server.

According to an embodiment, verification of a receipt qualification of participant(s) in an anonymous chatroom may be performed before operation 620 of selecting a remittee. A temporary profile corresponding to a participant whose receipt qualification is verified may be displayed as a temporary profile that is selectable as a remittee and a temporary profile corresponding to a participant whose receipt qualification is not verified may not be allowed to be selected as a remittee.

According to an embodiment, different from operation 630, a remittance request may be transmitted to the server without verifying a receipt qualification of a remittee, and the receipt qualification of the remittee may be determined when the remittee requests the remittance receipt.

Figure 7:
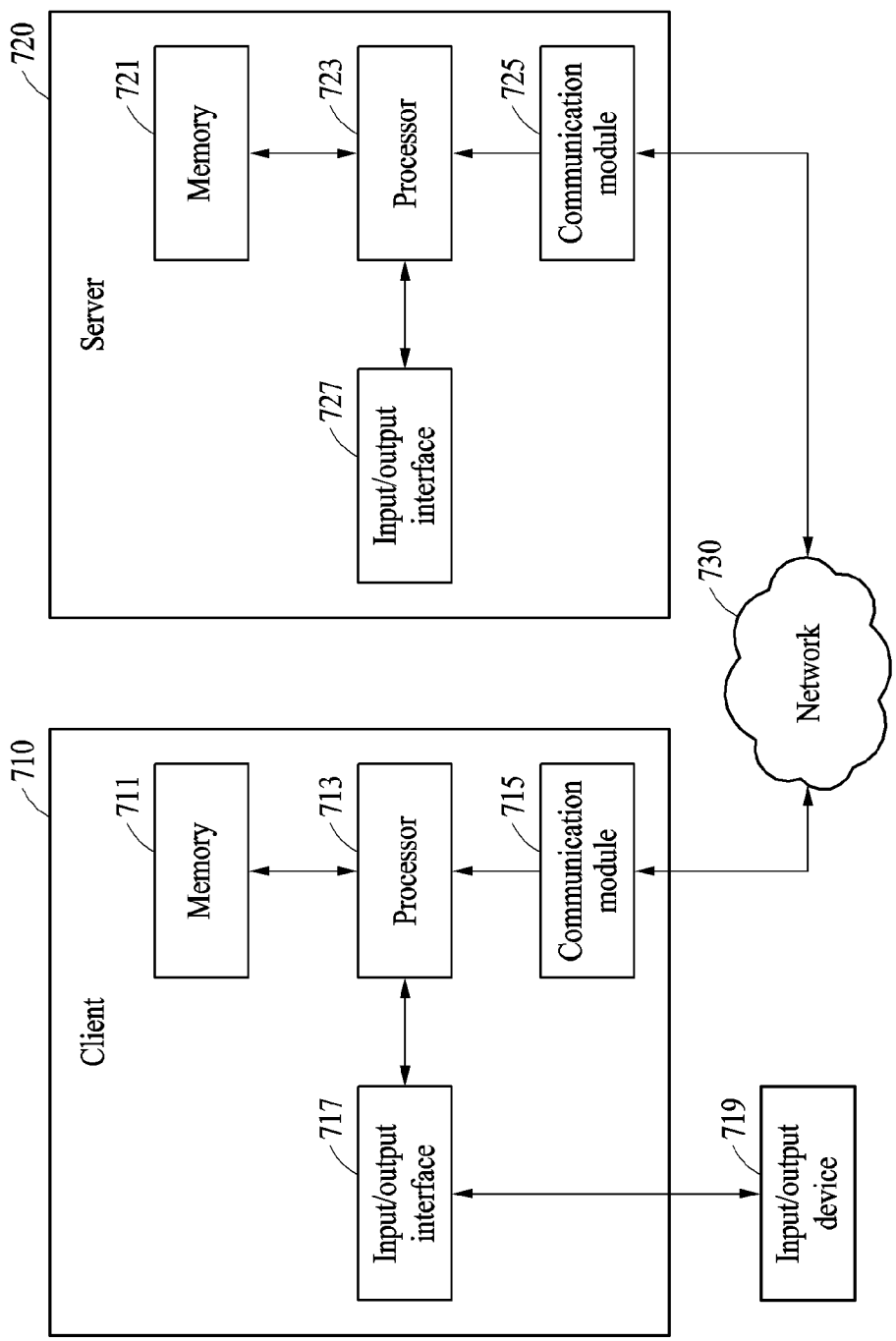
FIG. 7 is a diagram illustrating a hardware configuration of a remittance system, according to an embodiment.

FIG. 7 is a diagram illustrating a hardware configuration of a remittance system, according to an embodiment.

Referring to FIG. 7, the remittance system may include a server 720 and a client 710 connected to each other through a network 730.

The client 710 may be a mobile terminal implemented as a computer device. For example, the client 710 may communicate with the server 720 and/or other electronic devices through the network 730 by using a wired or wireless communication method.

The server 720 may be implemented as one or more computer devices providing commands, code, files, content, services, and the like by communicating with the client 710 and/or another server through the network 730. A communication method may not be limited and may include a communication method using a communication network (e.g., a mobile communication network, wired Internet, wireless Internet, and a broadcasting network) that may be in the network 730 and a short-distance wireless communication method between devices. For example, the network 730 may include one or more networks among networks, such as a personal area network (PAN), a local area network (LAN), a campus area network (CAN), a metropolitan area network (MAN), a wide area network (WAN), a broadband network (BBN), the Internet, and the like.

According to an embodiment, the server 720 may provide a file for installing an application to the client 710 accessing the server 720 through the network 730. In this case, the client 710 may use the file provided by the server 720 and may install an application (e.g., a remittance service app with a chat function or a chat service app with a remittance function). In addition, under control by an operating system (OS) in the client 710 and one or more programs (e.g., a browser or an installed application) in the client 710, the client 710 may access the server 720 and receive a service or content provided by the server 720. For example, when the client 710 transmits a service request message to the server 720 through the network 730 by control of an application, the server 720 may transmit code corresponding to the service request message to the client 710 and the client 710 may provide a user with content by composing and displaying a screen according to the code.

According to an embodiment, the client 710 and the server 720 may respectively include memories 711 and 721, processors 713 and 723, communication modules 715 and 725, and input/output interfaces 717 and 727.

The processors 713 and 723 may perform at least one operation described above with reference to FIGS. 1 to 6. For example, the processor 713 may perform at least one operation for using the remittance service, described above with reference to FIG. 6, provided to the client 710 by the server 720 and the processor 723 may perform at least one operation providing the remittance service, described above with reference to FIGS. 1 to 5, performed by the server 720. The processors 713 and 723 may be configured to process commands of a computer program by performing basic arithmetic, logic, and an input/output operation. The commands may be provided to the processors 713 and 723 by the memories 711 and 721 or the communication modules 715 and 725.

The memories 711 and 721 may be a computer-readable storage medium, which may be volatile or non-volatile memory. The memories 711 and 721 may store information for the remittance service described above with reference to FIGS. 1 to 6. For example, the memory 721 may store an account generated corresponding to a subscribing user and the authentication information of the account and mapping information of an account of a user to which a temporary profile is assigned and an identifier of the temporary profile that depends on an anonymous chatroom.

The memory 711 may include code for a chat service app with a remittance function or a remittance service app with a chat function that operates once installed in the client 710 of files provided through the network 730 by the server 720.

The memory 721 may store program implementing operations of a server providing the remittance service described above with reference to FIGS. 1 to 6.

The communication modules 715 and 725 may provide a function for the server 720 and the client 710 to communicate with each other through the network 730 and a function for the server 720 and the client 710 to communicate with another electronic device or another server through the network 730.

For example, a request generated by the processor 713 of the client 710 according to program code on a chat service app with a remittance function or a remittance service app with a chat function, which is stored in a storage device, such as the memory 711, may be transmitted to the server 720 through the network 730 by control of the communication module 715.

For example, control signals, commands, content, files, and the like provided by control of the processor 723 of the server 720 may be received by the client 710 through the communication module 715 of the client 710 after passing through the communication module 725 and the network 730.

The input/output interfaces 717 and 727 may interface with an input/output device 719. For example, an input device may include a device, such as a keyboard or a mouse, and an output device may include a device, such as a display for displaying a communication session of an application. In another example, the input/output interface 717 may interface with a device having input and output functions, such as a touch screen. Specifically, for example, when the processor 713 of the client 710 processes commands of a computer program loaded in the memory 711, content or a service screen composed by using data provided by the server 720 may be displayed on a display through the input/output interface 717. An input received from a user through the input/output device 719 may be provided in a form processable by the processor 713 of the client 710 through the input/output interface 717.

According to an embodiment, the client 710 and the server 720 may include other components than the illustrated ones in FIG. 7. For example, the client 710 may be implemented to include at least a portion of the input/output device 719 described above or may further include other components, such as transceivers, global positioning system (GPS) modules, cameras, various types of sensors, databases, and the like.

Figure 8:
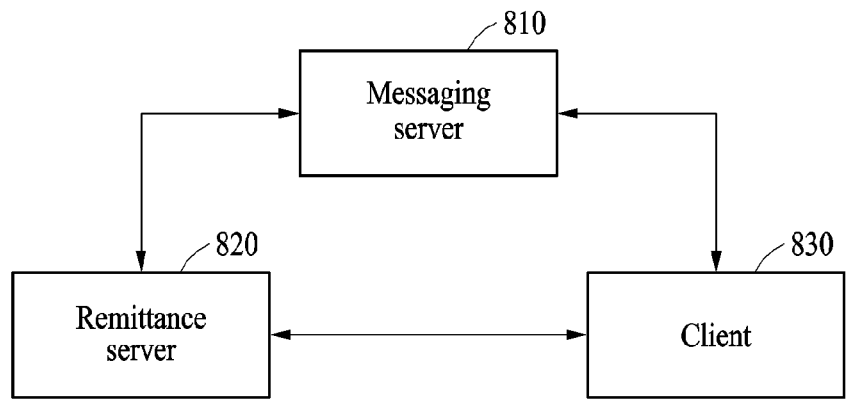
FIG. 8 is a diagram illustrating a remittance system according to an embodiment.

FIG. 8 is a diagram illustrating a remittance system according to an embodiment.

Referring to FIG. 8, the remittance system may include a messaging server 810, a remittance server 820, and a client 830. The messaging server 810 and the remittance server 820 may interoperate and include a device providing a remittance service. The client 830 may include a terminal of a user of the remittance service provided by the messaging server 810 and the remittance server 820.

The messaging server 810 may be a server providing a messaging service, which may transmit or receive messages between users subscribing for a service provided by the messaging server 810 or provide a messaging service for transmitting a notification message to a subscribing user. The messaging server 810 may provide a messaging service based on an instant message transmitted or received through a messenger application installed on a terminal of a subscribing user or may provide a messaging service based on a short message service (SMS) provided by a mobile communication service provider.

According to an embodiment, the messaging server 810 may generate an account corresponding to a user requesting a subscription, and the client 830 logging in to the generated account may use a service provided by the messaging server 810. The messaging server 810 may generate an account based on real name information of a user requesting a subscription. For example, the messaging server 810 may generate an account of a user based on authenticated real name information of a user requesting a subscription and/or a mobile phone number under the real name of the user requesting a subscription. The account may be a unit for identifying, by the messaging server 810, a user subscribing for a messaging service. For example, a message may be transmitted to an account of a user designated as a recipient in the messaging server 810, and messages transmitted and received in a chatroom or a list of chatrooms in which the user participates may be stored corresponding to the account of the user. The client 830 may set an account of the client 830 and an account of another user to be friends and may transmit and receive messages to and from the account of the other user set to be a friend through the messaging server 810.

According to an embodiment, the messaging server 810 may provide a messaging service to a user subscribing for another service linked with the messaging server 810, besides a user subscribing for the messaging service. The client 830 may log in to another service linked with the messaging server 810 and use a service provided by the messaging server 810.

The messaging server 810 may provide an anonymous chatroom service.

The remittance server 820 may be a server interoperating with the messaging server 810 and providing a remittance service and may generate and manage the accounts of users subscribing for the remittance service and provide a service of remitting and receiving a certain amount by using the accounts. For example, the remittance server 820 may include an online banking server of a bank and an online banking server providing a remittance service through an application.

According to an embodiment, the remittance server 820 may generate an account corresponding to a user requesting a subscription, and the client 830 logging in to the generated account may use a service provided by the remittance server 820. According to an embodiment, an account corresponding to the messaging server 810 of a user and an account corresponding to the remittance server 820 of the same user may be linked with each other. For example, the messaging server 810 may identify the account corresponding to the messaging server 810 from the account corresponding to the remittance server 820 and the remittance server 820 may identify the account corresponding to the remittance server 820 from the account corresponding to the messaging server 810.

According to an embodiment, the messaging server 810 may interoperate with the remittance server 820 and provide a remittance service. For example, the messaging server 810 may provide a user subscribing for a messaging service with a function of requesting the remittance server 820 for a remittance to an account of another user through a messaging application or a chatroom interface and a function of requesting the receipt of an amount remitted from the account of the other user therethrough. The remittance server 820 may identify a remitter requesting the messaging server 810 for a remittance and a remittee of the requested remittance and may process a remittance transaction between an account of the remitter and an account of the remittee that are provided by the remittance server 820. The messaging server 810 may transmit, to an account of a user, a message on a remittance transaction processed by the remittance server 820. In other words, the messaging server 810 may interoperate with the remittance server 820 and provide a remittance service to the client 830 logging in to the generated account.

According to an embodiment, the messaging server 810 may interoperate with the remittance server 820 and provide a remittance service for requesting the remittance server 820 for a remittance by designating, as a remittee, another participant whose account information is not identified in an anonymous chatroom. Hereinafter, the method of providing a remittance service between participants in an anonymous chatroom by the messaging server 810 by interoperating with the remittance server 820 and the operation method of the client 830 for using the remittance service between the participants in the anonymous chatroom provided by the messaging server 810 by interoperating with the remittance server 820 are described in detail.

Figure 9:
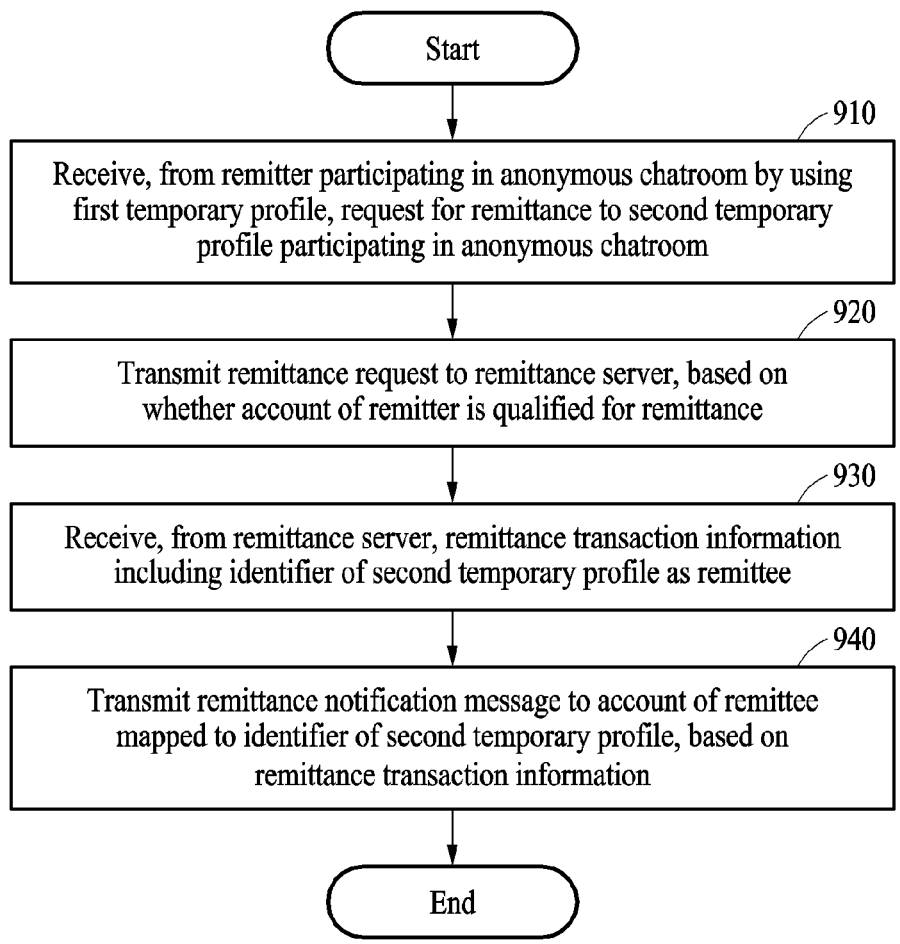
FIG. 9 is a flowchart illustrating a method of providing a remittance service by a messaging server by interoperating with a remittance server, according to an embodiment.

FIG. 9 is a flowchart illustrating a method of providing a remittance service by a messaging server by interoperating with a remittance server, according to an embodiment.

Referring to FIG. 9, the method of providing a remittance service by a messaging server, by interoperating with a remittance server, providing a messaging service may include receiving, in operation 910, from a remitter participating in an anonymous chatroom by using a first temporary profile, a request for a remittance to a second temporary profile participating in the anonymous chatroom, transmitting, in operation 920, the request for the remittance to the remittance server, based on whether an account of the remitter is qualified for the remittance, receiving, in operation 930, from the remittance server, remittance transaction information including an identifier of the second temporary profile as a remittee, and transmitting, in operation 940, a remittance notification message to an account of a remittee mapped to the identifier of the second temporary profile, based on the remittance transaction information. More specifically, the operations described in detail with reference to FIG. 9 may include a remittance process performed by the messaging server. For example, the messaging server, the one performing the operations described in detail with reference to FIG. 9, may correspond to the messaging server 810 of FIG. 8.

According to an embodiment, an account of a remitter may include an account generated when the remitter subscribes for a messaging service and an account of a remittee may include an account generated when the remittee subscribes for the messaging service.

According to an embodiment, the remitter may mean a client requesting a server for a remittance and the remittee may mean a client designated by the remitter as a recipient of the requested remittance. The client may include a terminal logging in to an account of a user subscribing for a service provided by the messaging server. The client may use a remittance service provided by a messaging server by interoperating with a remittance server by logging in to an account generated upon a subscription by the messaging server. For example, the remitter and the remittee may correspond to the client 830 of FIG. 8.

Operation 910 may include receiving a remittance request to a second temporary profile participating in an anonymous chatroom from a remitter participating by using a first temporary profile in the anonymous chatroom. As described above, the anonymous chatroom may be a chatroom in which participants participate with a temporary profile, and a participant of the anonymous chatroom may be displayed as a temporary profile to another participant and may transmit and receive messages in the anonymous chatroom by using the temporary profile.

The method of providing a remittance service may further include generating a temporary profile, which depends on the anonymous chatroom, corresponding to each participant of the anonymous chatroom and mapping an identifier of the temporary profile corresponding to each participant to an account of each participant subscribing for a messaging service and storing the identifier. The messaging server may map a temporary profile, generated to participate in the anonymous chatroom, of a user to an account, subscribing for the messaging service, of the user and may store the mapped temporary profile.

According to an embodiment, the messaging server may recognize the account of the user transmitting the remittance request as an account of a remitter and may recognize an account mapped to the identifier of the second temporary profile included in the remittance request as an account of a remittee. Because a client of the remitter knows the account of the client, the account of the remitter may be transmitted as information of the client transmitting the remittance request to the server.

According to an embodiment, the remittance request may be received through an anonymous chatroom.

For example, a remittance interface may be provided to a terminal of a user through an input of selecting a remittance button included in a menu tab of an interface of an anonymous chatroom or through an input of selecting a remittance button included in a temporary profile interface of a participant in the anonymous chatroom. The remittance interface is described in detail below.

Operation 920 may include transmitting a remittance request to a remittance server when an account of a remitter transmitting the remittance request is determined to have a remittance qualification. The remittance qualification may be determined by whether the account of the remitter is authenticated. For example, when the account of the remitter is an identity-authenticated account or the account has a certificate, on identity authentication, issued by a messaging server or an authentication server interoperating with the messaging server, the account is determined to have a remittance qualification. The authentication server may be a server interoperating with a messaging server and performing an authentication operation for a remittance qualification. This operation is described in detail below.

According to an embodiment, operation 920 of transmitting a remittance request may further include transmitting, to the account of the remitter, a remittance notification message including information on the second temporary profile as remittee information. A receipt qualification may be a qualification required to request remittance receipt through an anonymous chatroom, and more specifically, a qualification required to receive the requested remittance by designating, as a remittee, a temporary profile, not account information. The receipt qualification may be determined by whether an account of the remittee is authenticated. For example, when the account of the remittee is an identity-authenticated account or the account has a certificate, on identity authentication, issued by a messaging server or an authentication server interoperating with the messaging server, the account is determined to be qualified for receipt. A messaging server may transmit, to a remittance server, a remittance request when both a remittance qualification of an account of a remitter and a receipt qualification of an account of a remittee are verified.

According to an embodiment, a remittance process may verify a remittance qualification without verifying a receipt qualification, and the verification of a receipt qualification may be performed in a receipt process performed when receiving a receipt request from the remittee. The receipt process is described in detail below.

For example, the verification of a remittance qualification and/or the verification of a receipt qualification may be performed by an authentication module of a messaging server. The authentication module may be a module for performing identity authentication of an account of a user corresponding to a remitter and/or a remittee and performing an operation of determining whether the account of the user is identity-authenticated. For example, the authentication module may perform identity authentication of the account of the user in a predetermined method. In another example, the authentication module may generate and store authentication information (e.g., a certificate) based on identity authentication and provide the generated and stored authentication information to the account of the user and may perform an operation of verifying whether the account of the user is an identity-authenticated account. The messaging server may determine whether an account of a remitter has a remittance qualification, based on a verification result of whether the account of the remitter is authenticated by the authentication module. For example, the authentication module may be a separate authentication server interoperating with the messaging server.

According to an embodiment, a remittance request transmitted to a remittance server may include information needed for a remittance received from a remitter. As described above, the remittance request may include a remittee identifier, a remittance amount, and a remitter identifier. The remitter identifier may be an account of a remitter transmitting the remittance request. The remittee identifier may be an identifier of the second temporary profile designated as a remittee by the remitter, and the remittance amount may be an amount input by the remitter.

According to an embodiment, a remittance server may identify an account corresponding to a remittance server of a remitter, based on an account corresponding to a messaging server of the remitter included in a remittance request. The remittance server may perform the authentication of the remittance server separately from an authentication operation performed by the messaging server on the identified account corresponding to the remittance server of the remitter.

According to an embodiment, a remittance request may be directly transmitted to a remittance server from a remitter without passing through a messaging server. For example, the remitter may transmit the remittance request to the remittance server, based on a remittance qualification obtained by requesting the messaging server for the remittance qualification. In another example, the remittance qualification that is obtained by the messaging server to transmit the remittance request to the remittance server may not be required, the remittance server may determine a remittance qualification through authentication of an account of the remitter, and the remittance server may request the messaging server for the verification of the remittance qualification of the account of the remitter.

Operation 930 may include receiving remittance transaction information generated by a remittance server. In operation 920, the remittance server that receives a remittance request may generate remittance transaction information based on the received remittance request. The remittance server may generate the remittance transaction information after performing a procedure, such as a separate authentication operation, necessary for a remittance transaction in the remittance server. When a remittance transaction is determined to be inappropriate, for example, when the remitter fails to be authenticated after the procedure necessary for the remittance transaction in the remittance server, or when a balance is insufficient for a remittance to an account of a remittee, the remittance server may notify the messaging server that the remittance transaction may not proceed. The notification that the remittance transaction may not proceed may be transmitted to the remitter and/or the remittee through the messaging server.

According to an embodiment, the remittance transaction information may include a remittee identifier corresponding to the remittance request and a remittance transaction identifier corresponding to the remittance request. A remittance transaction identifier may be an identifier assigned to each remittance transaction unit for the remittance server to classify remittance transactions and recognize the classified remittance transactions. For example, the remittance transaction information may further include information on a valid period of a remittance transaction. The information on the valid period of a remittance transaction may mean a valid period during which remittance receipt may be requested and may be determined based on the time when a remittance request is made or the time when the remittance request is received by the messaging server or the remittance server. Information on a valid period of a remittance transaction may be generated by a messaging server and transmitted to a remittance server or may be generated by the remittance server.

According to an embodiment, in operation 930, remittance transaction information may be received together with a token for a remittance transaction. The token may be data generated based on an account of a remittee and an identifier of a temporary profile of the remittee by a messaging server and may be information needed to authenticate a remittance transaction. The messaging server may obtain an account of a remittee that is mapped to an identifier of the second temporary profile designated as the remittee and may thus generate a token based on the account of the remittee and the identifier of the second temporary profile. The messaging server may generate a token corresponding to an identifier of a temporary profile and an account of a user that is mapped to the identifier of the temporary profile according to the logic of generating the token. For example, the messaging server may generate a token further based on additional information for specifying a remittance transaction, such as information on a valid period of receipt according to the time when a remittance request is received. The token that is generated further based on the information on the valid period of receipt may be used to verify a valid period of remittance receipt by the messaging server. The method of authenticating a remittance transaction by using a token is described in detail below. The token may be transmitted to a remittance server with a remittance request in operation 920 of transmitting the remittance request to the remittance server by a messaging server and may be transmitted to a remittee through the messaging server together with remittance transaction information generated by the remittance server.

Operation 940 may include transmitting a remittance notification message or a remittance notification to an account of a remitter by obtaining the account of the remitter corresponding to an identifier of a temporary profile included as a remittee identifier in remittance transaction information. As described above, the messaging server may store mapping information of an account of a user to which a temporary profile and an identifier of the temporary profile that depends on an anonymous chatroom are assigned. The messaging server, based on the mapping information, may obtain the account of the remittee corresponding to the identifier of the temporary profile included as the remittee identifier in the remittance transaction information. The messaging server, through a remittance notification message, may transmit, to the remittee, a token for a remittance transaction and a remittance transaction identifier included in the remittance transaction information.

According to an embodiment, the remittance notification message transmitted to the remittee may include a message notifying the remittee of a remittance. For example, the remittance notification message transmitted to the remittee may include a notification that a certain amount is remitted from a remitter. The remittance notification message transmitted to the remittee may include information on the first temporary profile as remitter information.

According to an embodiment, the remittance notification message transmitted to the remittee may include a receipt request function. For example, the remittance notification message transmitted to the remittee may include an interfacing object for a receipt request. The remittee may request the remittance receipt based on the received remittance notification message and may initiate a remittance receipt process. The remittance receipt process is described in detail below.

The method of providing a remittance service may further include transmitting, to an account of a remitter, a remittance notification message including information on the second temporary profile as remittee information. The messaging server may transmit a remittance notification message to the account of the remitter, based on remittance transaction information received from the remittance server. The remittance notification message transmitted to the remitter may include a message notifying the remitter that a remittance is transmitted. Remittance transmission is different from remittance receipt completion, and remittance receipt may be completed when a remittance receipt process is completed after a remittee requests the receipt of the transmitted remittance. For example, the remittance notification message transmitted to the remitter may include a notification that a certain amount is remitted to a remittee, and information on the remittee may be displayed as information on the second temporary profile.

The detailed examples of remittance notification messages transmitted to a remittee and a remitter are described in detail below.

Figure 10:
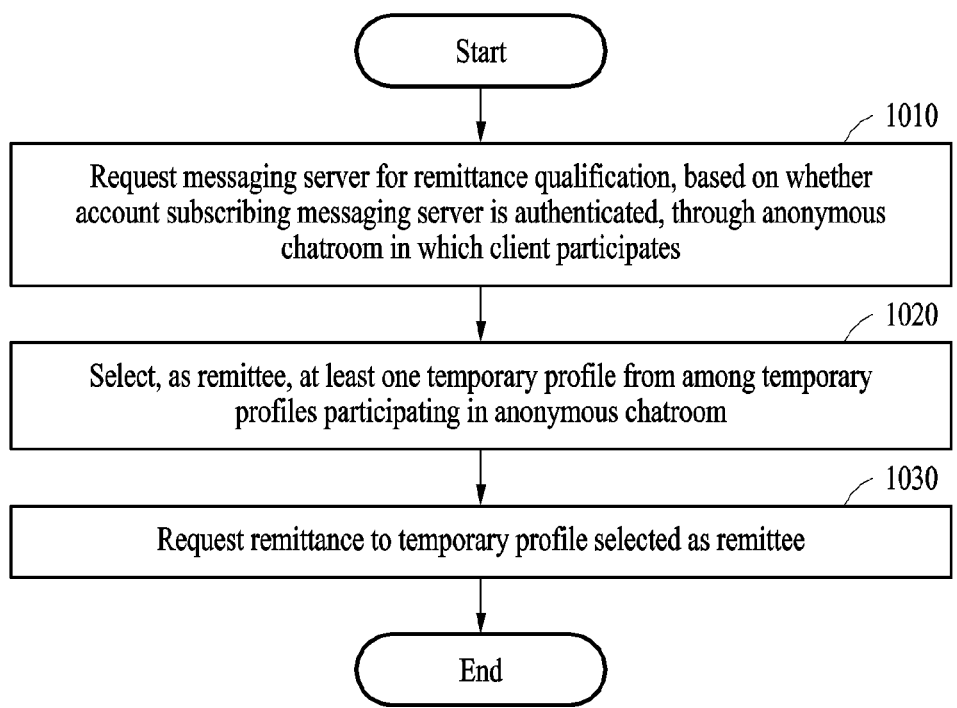
FIG. 10 is a flowchart illustrating an operation method of a client to use a remittance service provided by a messaging server by interoperating with a remittance server, according to an embodiment.

FIG. 10 is a flowchart illustrating an operation method of a client to use a remittance service provided by a messaging server by interoperating with a remittance server, according to an embodiment.

Referring to FIG. 10, the operation method of the client to use a remittance service provided by a messaging server by interoperating with a remittance server may include requesting, in operation 1010, the messaging server for a remittance qualification, based on whether an account subscribing for the messaging service is authenticated, through an anonymous chatroom in which the client participates, selecting, in operation 1020, as a remittee, at least one temporary profile from among temporary profiles participating in the anonymous chatroom, and requesting, in operation 1030, a remittance to the temporary profile selected as the remittee. More specifically, the operations described in detail with reference to FIG. 10 may correspond to a remittance process performed by a client corresponding to a remitter. For example, the client, that is, the one performing the operations described in detail with reference to FIG. 10 may correspond to the client 830 of FIG. 8.

Operation 1010 may include requesting the messaging server for a remittance qualification when an account subscribing for the messaging service of the client is not verified. As described above, the remittance qualification may be a qualification required to request a remittance through an anonymous chatroom and may be determined based on authentication. Operation 1010 may include requesting the messaging server for authentication to obtain a remittance qualification. For example, the client may register authentication information to the messaging server by performing identity authentication provided by the messaging server or may obtain a remittance qualification by performing an authentication operation to obtain a certificate issued by the messaging server or an authentication server linked with the messaging server. The client may perform a remittance process through an anonymous chatroom, based on the obtained remittance qualification.

Operation 1020 may include selecting, by the client of which the remittance qualification is verified by the messaging server in operation 1010, at least one of temporary profiles participating in the anonymous chatroom.

Operation 1030 may include requesting the messaging server or the remittance server for remittance, which designates, as a remittee, an identifier of an anonymous profile, not an account of another user. In other words, the client of which the remittance qualification is verified may request a remittance from its counterpart of which account information is not identified. For example, a remittance request may be transmitted to the remittance server through the messaging server or may be directly transmitted to the remittance server.

Operation 1030 may include an operation of requesting a remittance to a selected temporary profile, based on a receipt qualification of a participant corresponding to the selected temporary profile. A remittance request may be transmitted based on a receipt qualification of a remittee. The messaging server may determine the receipt qualification of the remittee, based on whether an account mapped to the temporary profile selected as the remittee is authenticated. When the receipt qualification of the remittee is verified, the remittance request may be transmitted to the remittance server or the messaging server.

According to an embodiment, verification of a receipt qualification of participant(s) in an anonymous chatroom may be performed before operation 1020 of selecting a remittee. A temporary profile corresponding to a participant whose receipt qualification is verified may be displayed as a temporary profile that is selectable as a remittee and a temporary profile corresponding to a participant whose receipt qualification is not verified may not be allowed to be selected as a remittee.

According to an embodiment, different from operation 1030, a remittance request may be transmitted without verifying a receipt qualification of a remittee, and the receipt qualification of the remittee may be determined when the remittee requests the remittance receipt.

Figure 11:
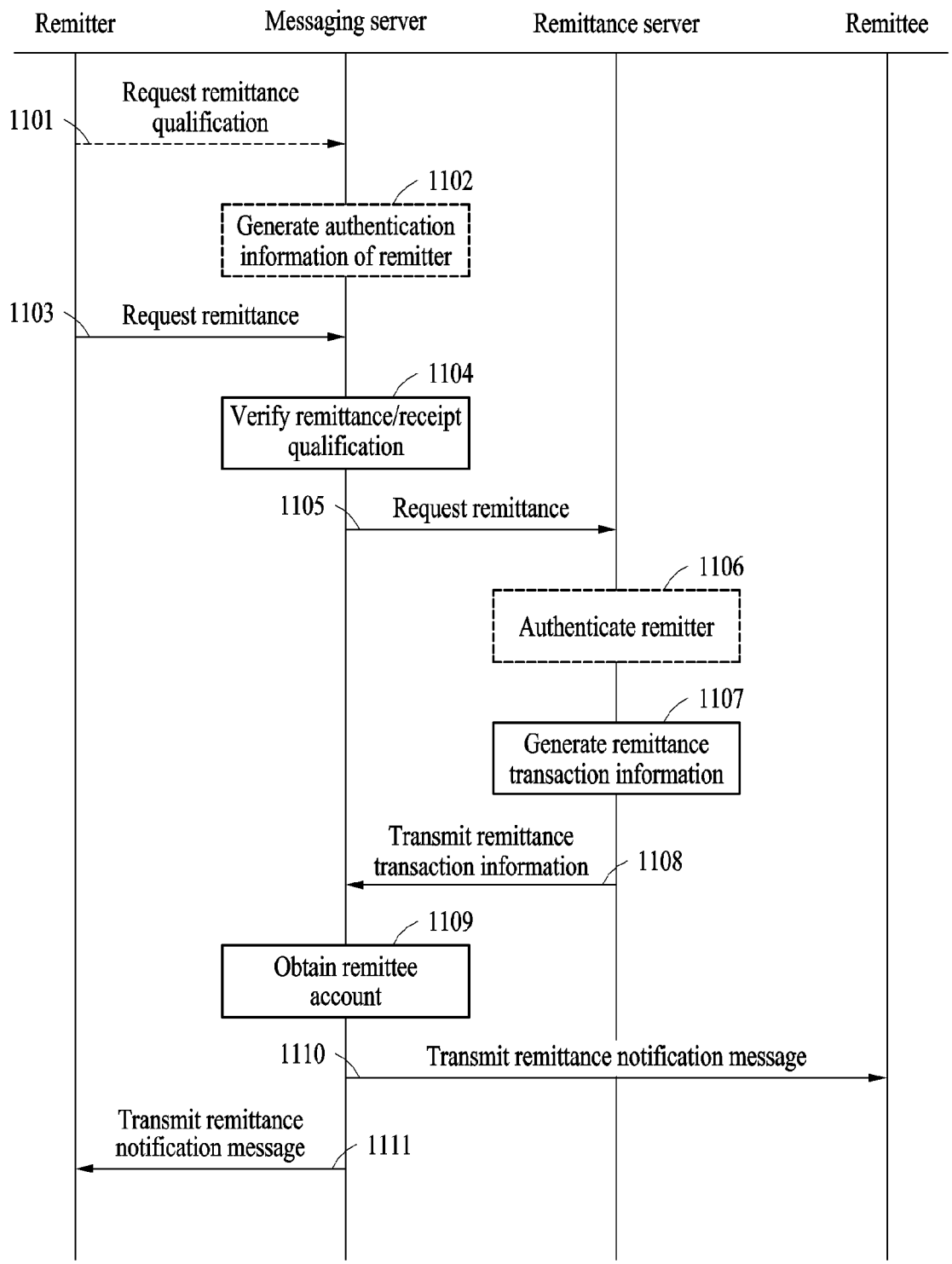
FIG. 11 is a diagram illustrating a whole scenario of a remittance process, according to an embodiment.

FIG. 11 is a diagram illustrating a whole scenario of a remittance process, according to an embodiment.

Referring to FIG. 11, a remitter may be a client requesting a remittance and a remittee may be a client designated by the remitter as a recipient of the remittance. For example, the remitter and the remittee may correspond to the client 830 of FIG. 8, a messaging server may correspond to the messaging server 810 of FIG. 8, and a remittance server may correspond to the remittance server 820 of FIG. 8.

Referring to FIG. 11, the remitter may request, in operation 1103, the messaging server for a remittance, and a remittance request may include a remittance amount and an identifier of a temporary profile of another user participating in an anonymous chatroom. The remitter may request, in operation 1101, the messaging server for a remittance qualification before requesting a remittance in operation 1103, and in response to the remittance request, the messaging server may generate, in operation 1102, authentication information by performing authentication of an account of the remitter.

For example, the messaging server may verify, in operation 1104, a receipt qualification of a remittee and/or the remittance qualification of the remitter in response to the remittance request. For example, the messaging server may verify the remittance qualification of the remitter without verifying the receipt qualification of the remittee in a remittance process.

As described above, an authentication operation to verify a remittance qualification and a receipt qualification may be performed in an authentication module of the messaging server or an authentication server linked with the messaging server. When the authentication operation is performed in the authentication server linked with the messaging server, the remittance qualification request in operation 1101 may be transmitted to the authentication server, and the authentication server may generate, in operation 1102, authentication information of the remitter. The remittance qualification request in operation 1101 may be transmitted to the authentication server through the messaging server or may be directly transmitted to the authentication server. In addition, based on the remittance request in operation 1103, the authentication server may perform the verification, in operation 1104, of a remittance qualification and/or a receipt qualification and may transmit a verification result to the messaging server.

For example, the messaging server may transmit, in operation 1105, a remittance request to the remittance server when the remittance qualification is verified. The remittance request may include an account of a remitter transmitting the remittance request, an identifier of a temporary profile corresponding to a remittee designated by the remitter, and a remittance amount. As described above, when transmitting, in operation 1105, the remittance request to the remittance server, the messaging server may transmit a token on a remittance transaction together therewith.

For example, the remittance server receiving the remittance request from the messaging server may generate, in operation 1107, remittance transaction information based on the remittance request. As described above, remittance transaction information corresponding to the remittance request may include a remittee identifier and a remittance transaction identifier. The remittee identifier may include an identifier of the temporary profile of the remittee included in the remittance request. For example, the remittance server receiving the remittance request from the messaging server may authenticate, in operation 1106, the remitter or may generate, in operation 1107, remittance transaction information when the remitter is authenticated by performing an authentication operation on the remitter separately from a verification operation on the remittance qualification performed by the messaging server.

For example, the remittance transaction information generated by the remittance server together with a token corresponding to the remittance transaction information may be transmitted, in operation 1108, to the messaging server. The messaging server, based on the remittance transaction information, may obtain an account of the remittee mapped to an identifier of a temporary profile included as a remittee identifier in the remittance transaction information.

For example, the messaging server may transmit, in operation 1110, a remittance notification message to the obtained account of the remittee. The remittance notification message may include remittance transaction information and a token for a remittance transaction. For example, the messaging server may transmit, in operation 1111, to the account of the remitter, a remittance notification message to notify the remitter that the remittance is transmitted to the remittee.

Figure 12A:
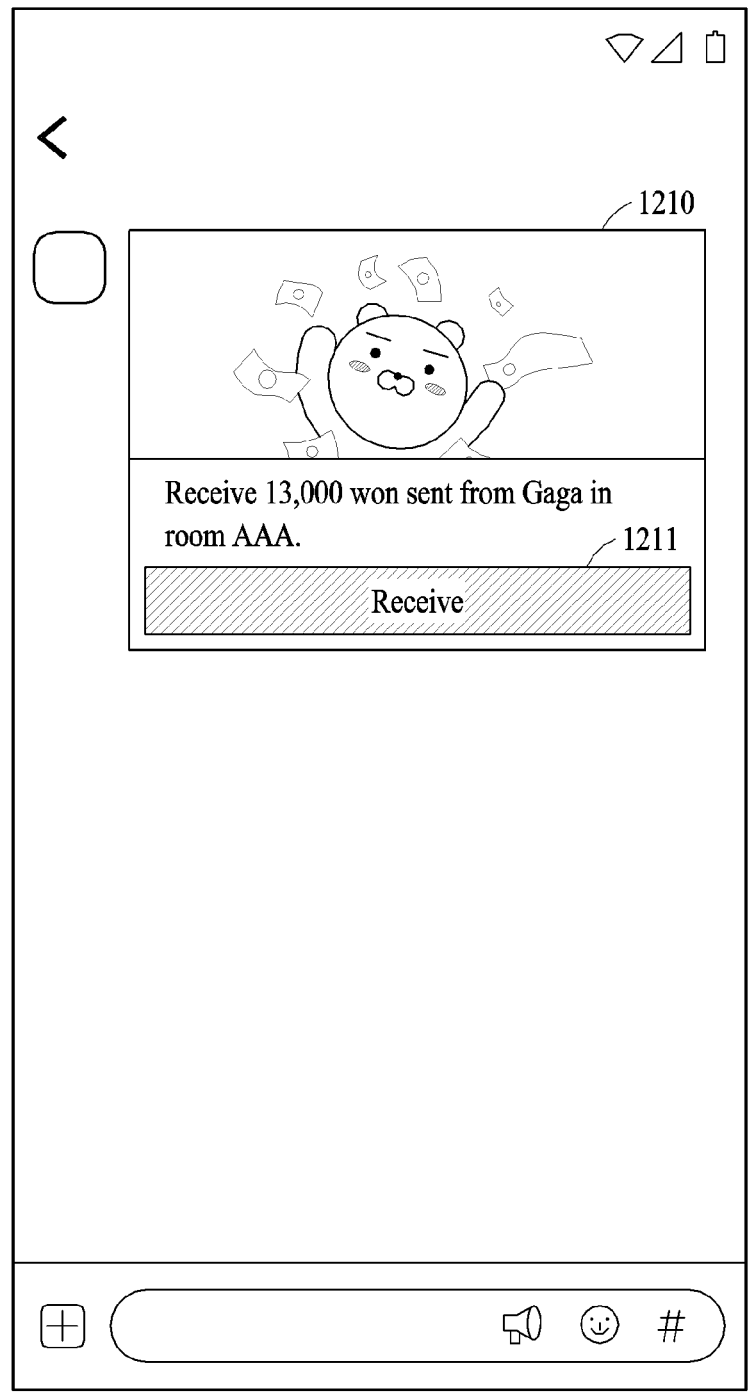
FIGS. 12A and 12B are diagrams each illustrating a remittance notification message according to an embodiment.
Figure 12B:
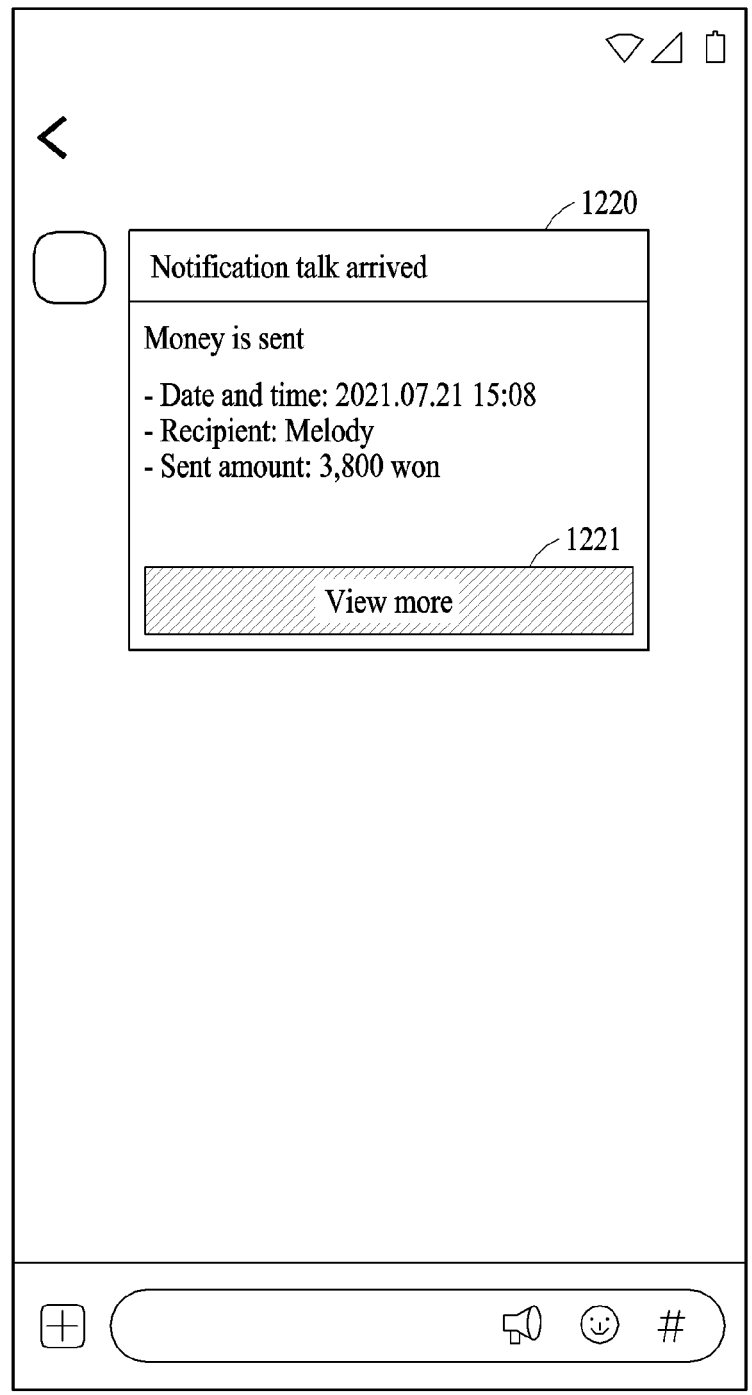

FIGS. 12A and 12B are diagrams each illustrating a remittance notification message according to an embodiment.

Referring to FIG. 12A, a remittance notification message 1210 may be transmitted to an account of a remittee through a chatroom. For example, the chatroom to which the remittance notification message 1210 is transmitted may be a chatroom of the account of the remittee and an account related to a remittance server, in which the chatroom of the account related to the remittance server may be a type of chatroom for transmitting an informational message that is generated with the account related to the remittance server being a sender. In another example, the chatroom in which the remittance notification message 1210 is transmitted may be a 1:1 anonymous chatroom between a remitter and a remittee. The 1:1 anonymous chatroom including the remitter and the remittee may be generated when a remittance request is made in an anonymous chatroom further including participants other than the remitter and the remittee, and the remittance notification message 1210 may be transmitted and received through the generated 1:1 anonymous chatroom. Temporary profiles of the remitter and the remittee in the newly generated 1:1 anonymous chatroom may be the same as temporary profiles in the anonymous chatroom in which the remittance request is made. Alternatively, when the remittance request is made in the 1:1 anonymous chatroom including the remitter and the remittee, the remittance notification message 1210 may be transmitted and received in the 1:1 anonymous chatroom.

According to an embodiment, the remittance notification message 1210 may include a notification that a certain amount is remitted from the remitter. For example, information on the remitter included in the remittance notification message 1210 may include a name (e.g., 'Gaga') set for the temporary profile that depends on the anonymous chatroom in which the remittance request is made by the remitter. As described above, a name set for a temporary profile may be a name or a byname temporarily set for the temporary profile, not real name information included in an account of a remitter. In another example, the remittance notification message 1210 may include an anonymous chatroom in which a remittance request is made. Information on an anonymous chatroom may include a name (e.g., 'AAA') set for the anonymous chatroom in which a remitter and a remittee participate.

According to an embodiment, the remittance notification message 1210 may include an interfacing object 1211 for a receipt request. A remittee may transmit a receipt request to a remittance server or a messaging server by selecting the interfacing object 1211 included in the remittance notification message 1210. The interfacing object 1211 may be an object including a function of transmitting, to the messaging server or the remittance server, by a selection input, a remittance transaction identifier corresponding to a remittance request and a token for a remittance transaction.

Referring to FIG. 12B, a remittance notification message 1220 may be transmitted to an account of a remitter through a chatroom. For example, the chatroom to which the remittance notification message 1220 is transmitted may be a chatroom of the account of the remitter and an account related to a remittance server, in which the chatroom of the account related to the remittance server may be a type of chatroom for transmitting an informational message that is generated with the account related to the remittance server being a sender. As described above, the chatroom in which the remittance notification message 1220 is transmitted may be a 1:1 anonymous chatroom between a remitter and a remittee.

According to an embodiment, the remittance notification message 1220 may include a notification that a certain amount is remitted to the remittee. For example, information on the remittee included in the remittance notification message 1220 may include a name (e.g., 'Melody') set for a temporary profile that depends on an anonymous chatroom in which a remittance request is made by the remitter. As described above, a name set for a temporary profile may be a name or a byname temporarily set for the temporary profile, not real name information included in an account of a remittee.

According to an embodiment, the remittance notification message 1220 may include an interfacing object 1221 to provide detailed information on a remittance request. The remitter may request a messaging server or a remittance server for a page displaying the detailed information on the remittance request by selecting the interfacing object 1221 included in the remittance notification message 1220.

Figure 13:
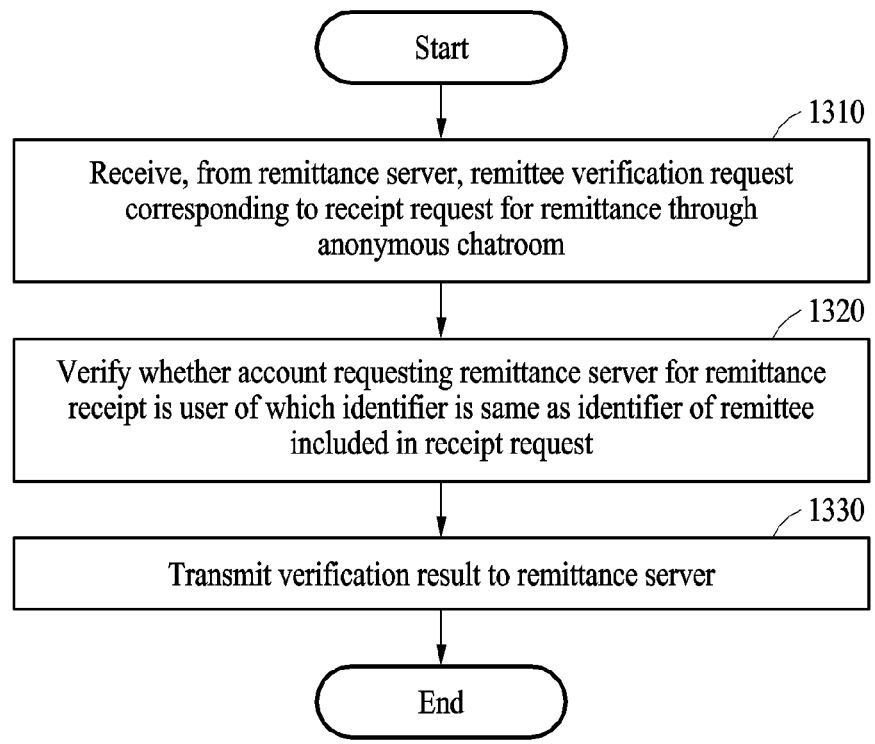
FIG. 13 is another flowchart illustrating a method of providing a remittance service by a messaging server by interoperating with a remittance server, according to an embodiment.

FIG. 13 is another flowchart illustrating a method of providing a remittance service by a messaging server by interoperating with a remittance server, according to an embodiment.

Referring to FIG. 13, the method of providing a remittance service by the messaging server, providing a messaging service, by interoperating with the remittance server may include receiving, in operation 1310, from the remittance server, a remittee verification request corresponding to a receipt request for a remittance through an anonymous chatroom, verifying, in operation 1320, whether an account requesting the remittance server for remittance receipt is a user of which an identifier is the same as an identifier of the remittee included in the receipt request, and transmitting, in operation 1330, a verification result to the remittance server. More specifically, the operations described in detail with reference to FIG. 13 may include a receipt process performed by the messaging server. For example, the messaging server, the one performing the operations described in detail with reference to FIG. 13, may correspond to the messaging server 810 of FIG. 8.

Operation 1310 may include an operation of receiving, from the remittance server, a verification request whether a remittee identifier corresponds to an account requesting receipt. The remittee identifier included in the receipt request may be an identifier of a temporary profile designated by a remitter when requesting a remittance and may be a remittee identifier included in remittance transaction information. The remittance server may not verify whether the account requesting the receipt and the identifier of the temporary profile corresponding to the remittee identifier are the same user because the remittance server does not store mapping information of the account requesting the receipt and the identifier of the temporary profile corresponding to the remittee identifier and may request the messaging server for verification.

According to an embodiment, the remittee may request the messaging server or the remittance server for remittance receipt through a remittance notification message. The receipt request may include remittance transaction information included in the remittance notification message and a token for a remittance transaction. For example, the receipt request may include a remittance transaction identifier corresponding to a remittance request, a token for a remittance transaction corresponding to the remittance request, and a remittee identifier corresponding to the remittance request. Referring to FIG. 12A, for example, the remittance notification message transmitted to the account of the remittee may include the interfacing object 1211 for a receipt request, and the remittee may request the messaging server or the remittance server for remittance receipt through an input of selecting the interfacing object 1211. When a selection input of an interfacing object is received, a receipt request including remittance transaction information included in a remittance notification message may be transmitted to a remittance server or a messaging server.

According to an embodiment, the receipt request transmitted to the remittance server may be transmitted to the remittance server through the messaging server from a remittee or may be transmitted to the remittance server directly from the remittee. When the receipt request is transmitted through the messaging server, the messaging server may verify a receipt qualification of the remittee transmitting the receipt request, and based on the receipt qualification, may transmit the receipt request to the remittance server. In other words, the method of providing a remittance service may further include receiving the receipt request from the account of the remittee, based on the remittance notification message transmitted to the account of the remittee, and transmitting the receipt request to the remittance server, based on whether the account of the remittee is qualified for receipt.

Operation 1320 may include verifying whether the account requesting the remittance server for remittance receipt is the same user as the identifier of the remittee included in the receipt request, based on mapping information of accounts of participants and identifiers of temporary profiles of the participants that depend on an anonymous chatroom. As described above, the messaging server may map and store an account of a user and an identifier of a temporary profile that depends on the anonymous chatroom. Based on the mapping information of the account and the identifier of the temporary profile, the messaging server may obtain an account mapped to the remittee identifier and verify the remittee by determining whether the obtained account and the account requesting the remittance receipt is the same user.

Operation 1320 may further include verifying a remittance transaction based on a token for the remittance transaction. The token for the remittance transaction may be included in the receipt request transmitted to the remittance server and may be transmitted to the messaging server from the remittance server. The messaging server, based on the mapping information, may obtain an account mapped to the remittee identifier included in the receipt request. The messaging server may verify the remittance transaction by generating a token based on the remittee identifier and the obtained account and comparing whether the generated token is the same as the token included in the receipt request.

Operation 1320 may further include verifying a remittance transaction based on a valid period for receiving a remittance. As described above, a token may be generated further based on information on a valid period, and the messaging server may verify whether a remittance transaction is valid by verifying a valid period of receipt in a process of verifying the remittance transaction based on the token.

Operation 1330 may include an operation of providing a remittee verification result in operation 1320 to the remittance server. The result transmitted to the remittance server in operation 1330 may include a result of whether the account requesting the receipt is the remittee included in the remittance transaction information of the receipt request, and the mapping information of the account and the identifier of the temporary profile may not be provided to the remittance server.

According to an embodiment, the remittance server may process a receipt request based on a verification result. The processing of a receipt request may mean processing the remittance request of transmitting a remittance amount from an account of a remitter to an account of a remittee. For example, remittance transaction information may further include information on a valid period of receipt of a remittance, and the remittance server may determine whether to process the remittance transaction based on the valid period of receipt included in the remittance transaction information. When receipt is requested within the valid period of receipt included in the remittance transaction information, the receipt request may be processed. However, when the valid period expires, the receipt request may be determined to be an invalid remittance transaction and may not be processed. When the receipt request is not processed, the remittance server may notify the messaging server that the remittance transaction is not processed, and the messaging server may notify the account of the remitter and/or the account of the remittee that the remittance transaction is not processed. The remittance server may transmit a processing result of a receipt request to the messaging server, and the messaging server may transmit a receipt notification message to an account of a remitter and/or an account of a remittee. The receipt notification message may include a message notifying a remittance is received.

For example, the method of providing a remittance service may further include receiving, from the remittance server, a processing result of a receipt request and transmitting a receipt notification message to an account requesting receipt in response to the processing result.

In another example, the method of providing a remittance service may further include receiving, from the remittance server, a processing result of a receipt request and transmitting a receipt notification message to an account requesting a remittance in response to the processing result.

Figure 14:
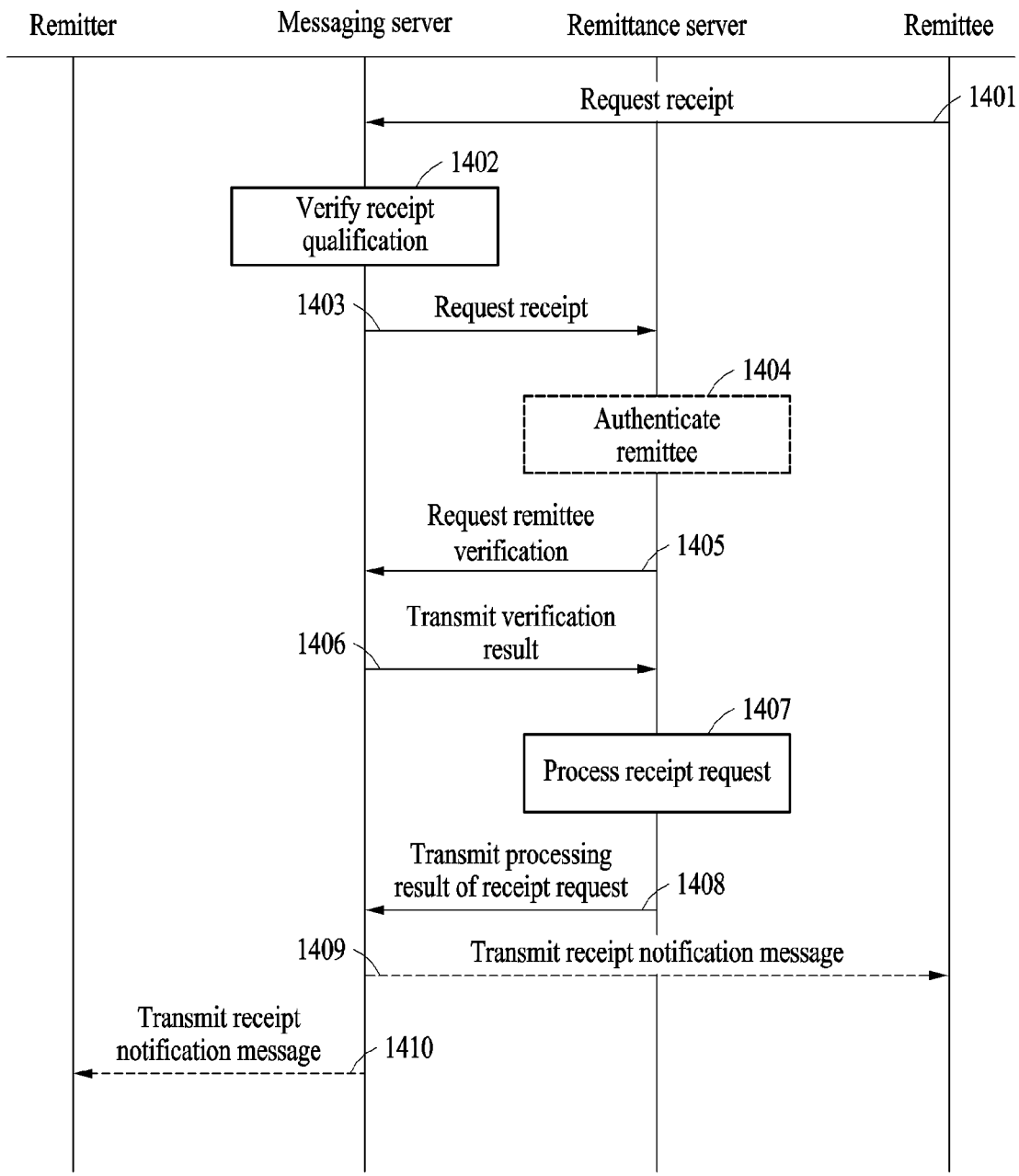
FIG. 14 is a diagram illustrating a whole scenario of a receipt process of a remittance service, according to an embodiment.

FIG. 14 is a diagram illustrating a whole scenario of a receipt process of a remittance service, according to an embodiment.

Referring to FIG. 14, a remitter may be a client requesting a remittance and a remittee may be a client designated by the remitter as a recipient of the remittance. The remitter and the remittee may correspond to the client 830 of FIG. 8, a messaging server may correspond to the messaging server 810 of FIG. 8, and a remittance server may correspond to the remittance server 820 of FIG. 8. For example, the receipt process illustrated in FIG. 14 may correspond to the process performed after the remittance process illustrated in FIG. 11.

Referring to FIG. 14, the remittee may request, in operation 1401, the messaging server for remittance receipt through a remittance notification message. The receipt request may include remittance transaction information included in the remittance notification message.

For example, the messaging server, in response to the received receipt request, may verify, in operation 1402, a receipt qualification of the remittee. As described above, the verification of the receipt qualification of the remittee may be performed in response to a remittance request received from the remitter in a remittance process. The verification of the receipt qualification may be performed in the receipt process separately from the remittance process and may be omitted when the receipt qualification is verified in the remittance process.

For example, the messaging server may transmit, in operation 1403, the receipt request to the remittance server when the receipt qualification is verified. The receipt request may include an account of the remittee transmitting the receipt request, a remittee identifier included in the remittance transaction information, and a remittance transaction identifier included in the remittance transaction information and may further include a token for the remittance transaction.

Although FIG. 14 illustrates an example of transmitting the receipt request to the remittance server through the messaging server, the receipt request may be directly transmitted to the remittance server without passing through the messaging server.

For example, the remittance server receiving the receipt request from the messaging server may request, in operation 1405, the messaging server for remittee verification of whether the remittee identifier included in the receipt request and an account requesting receipt are the same user. For example, the remittance server receiving the receipt request from the messaging server may authenticate, in operation 1404, by performing an authentication operation on the remittee separately from a verification operation on a receipt qualification performed by the messaging server and may request, in operation 1405, the messaging server for remittee verification when the remittee is authenticated.

For example, the messaging server may verify the remittee by obtaining an account mapped to an identifier of a temporary profile, that is, the remittee identifier included in the receipt request, and determining whether the obtained account and the account requesting receipt are the same user. The messaging server may transmit, in operation 1406, to the remittance server, that the remittee is valid when the obtained account and the account requesting receipt are determined to be the same user as a result of verification and that the remittee is not valid when the obtained account and the account requesting receipt are determined to be not the same user.

For example, the remittance server may process, in operation 1407, the receipt request when receiving the verification result that the remittee is valid and may transmit, in operation 1408, to the messaging server, a processing result of the receipt request.

For example, the messaging server may transmit, in operations 1409 and 1410, a receipt notification message to the account of the remittee and/or an account of the remitter when receiving the processing result of the receipt request in operation 1408.

Figure 15A:
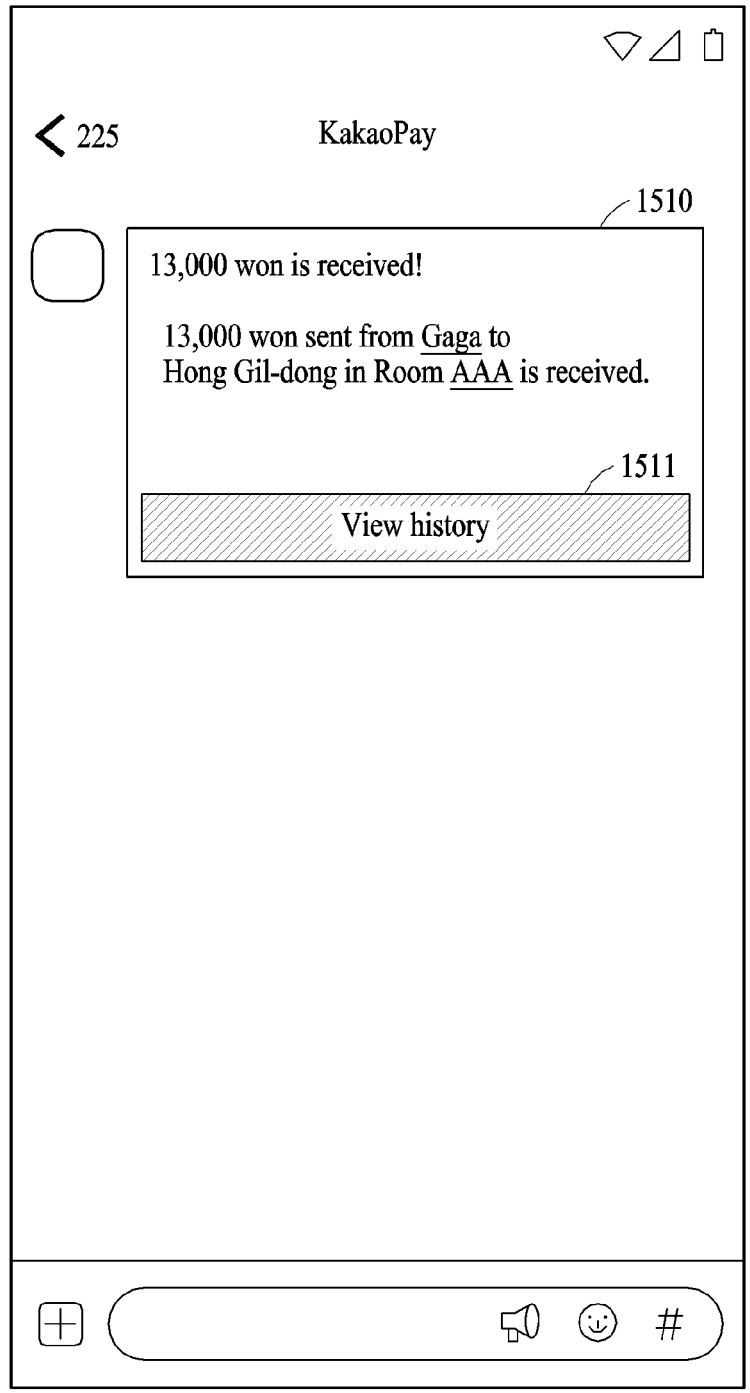
FIGS. 15A and 15B are diagrams each illustrating a receipt notification message according to an embodiment.
Figure 15B:
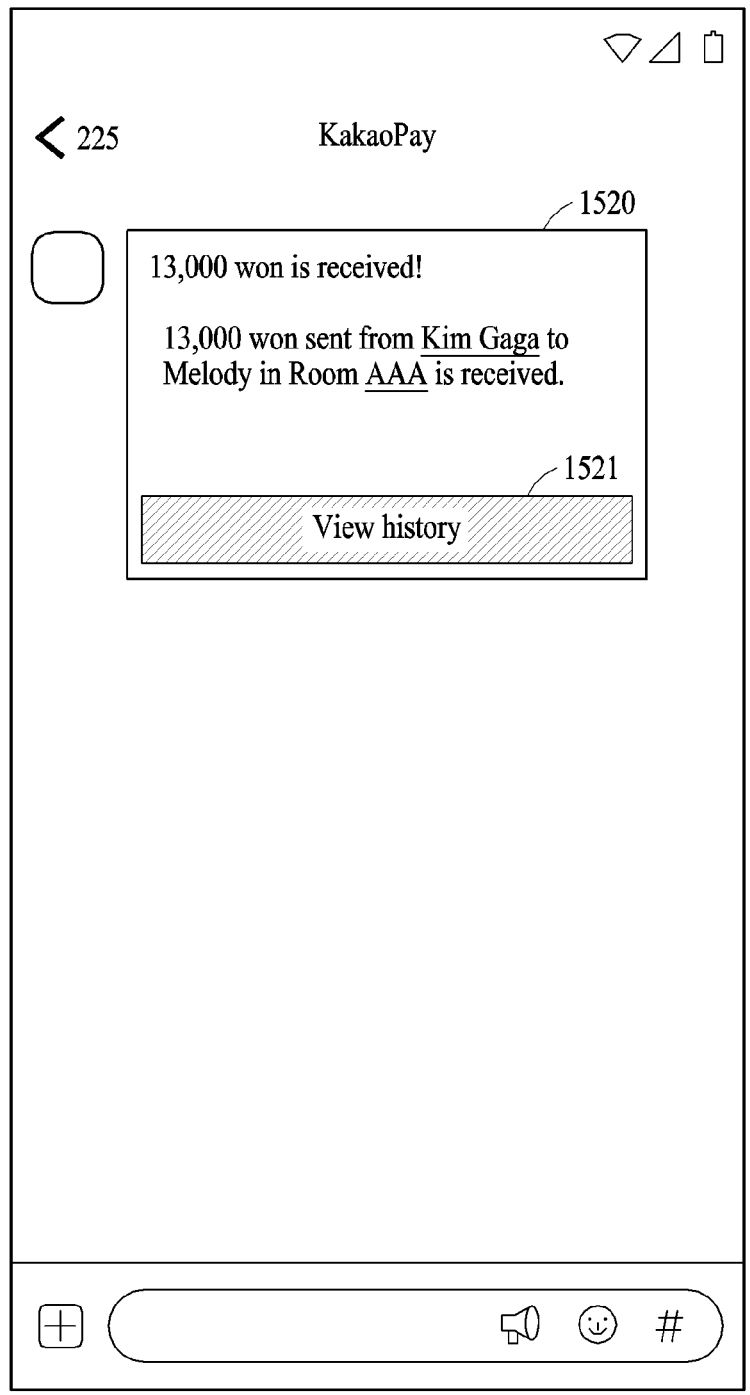

FIGS. 15A and 15B are diagrams each illustrating a receipt notification message according to an embodiment.

Referring to FIG. 15A, a receipt notification message 1510 may be transmitted to an account of a remittee through a chatroom. For example, the chatroom to which the receipt notification message 1510 is transmitted may be a chatroom of the account of the remittee and an account related to a remittance server, in which the chatroom of the account related to the remittance server may be a type of chatroom for transmitting an informational message that is generated with the account related to the remittance server being a sender. As described above, the chatroom in which the receipt notification message 1510 is transmitted may be a 1:1 anonymous chatroom between a remitter and a remittee.

According to an embodiment, the receipt notification message 1510 may include a notification that a certain amount remitted from the remitter is received by the remittee. For example, information on the remitter included in the receipt notification message 1510 may include a name (e.g., 'Gaga') set for the temporary profile that depends on the anonymous chatroom in which the remittance request is made by the remitter. As described above, a name set for a temporary profile may be a name or a byname temporarily set for the temporary profile, not real name information included in an account of a remitter.

According to an embodiment, information on the remittee included in the receipt notification message 1510 may be displayed as real name information (e.g., 'Hong Gil-dong') included in the account of the remittee or as a temporary profile, based on the type of chatroom to which the receipt notification message 1510 is transmitted. For example, when the receipt notification message 1510 is transmitted through the chatroom with an account related to the remittance server, the information on the remittee included in the receipt notification message 1510 may include the real name information (e.g., 'Hong Gil-dong') included in the account of the remittee. Because a receipt notification message transmitted to an account of a remittee may not need to display the account of the remittee as a temporary profile, remittee information may be displayed as account information of the remittee. In addition, when the receipt notification message 1510 is transmitted through the 1:1 anonymous chatroom between the remitter and the remittee, the information on the remittee included in the receipt notification message 1510 may be displayed as the temporary profile of the remittee such that the real name information of the remittee may not be exposed to the remitter.

In another example, the receipt notification message 1510 may include an anonymous chatroom in which a remittance request is made. Information on an anonymous chatroom may include a name (e.g., 'AAA') set for the anonymous chatroom in which a remitter and a remittee participate.

According to an embodiment, the receipt notification message 1510 may include an interfacing object 1511 to provide detailed information on a remittance transaction. The remittee may request the messaging server or the remittance server for a page displaying the detailed information on the remittance transaction by selecting the interfacing object 1511 included in the receipt notification message 1510.

Referring to FIG. 15B, a receipt notification message 1520 may be transmitted to an account of a remitter through a chatroom. For example, the chatroom to which the receipt notification message 1520 is transmitted may be a chatroom of the account of the remitter and an account related to a remittance server, in which the chatroom of the account related to the remittance server may be a type of chatroom for transmitting an informational message that is generated with the account related to the remittance server being a sender. As described above, the chatroom in which the receipt notification message 1510 is transmitted may be a 1:1 anonymous chatroom between a remitter and a remittee.

According to an embodiment, the receipt notification message 1520 may include a notification that a certain amount remitted from the remitter is received by the remittee. For example, information on the remittee included in the receipt notification message 1520 may include a name (e.g., 'Melody') set for a temporary profile that depends on an anonymous chatroom in which a remittance request is made by the remitter. As described above, a name set for a temporary profile may be a name or a byname temporarily set for the temporary profile, not real name information included in an account of a remittee.

According to an embodiment, information on the remitter included in the receipt notification message 1520 may be displayed as real name information (e.g., 'Kim Gaga') included in the account of the remitter or as a temporary profile, based on the type of the chatroom to which the receipt notification message 1520 is transmitted. For example, when the receipt notification message 1520 is transmitted through the chatroom with an account related to the remittance server, the information on the remitter included in the receipt notification message 1520 may include the real name information (e.g., 'Kim Gaga') included in the account of the remitter. Because a receipt notification message transmitted to an account of a remitter may not need to display the account of the remitter as a temporary profile, remitter information may be displayed as account information of the remitter. In addition, when the receipt notification message 1520 is transmitted through the 1:1 anonymous chatroom between the remitter and the remittee, the information on the remitter included in the receipt notification message 1520 may be displayed as the temporary profile of the remitter such that the real name information of the remitter may not be exposed to the remittee.

In another example, the receipt notification message 1510 may include an anonymous chatroom in which a remittance request is made. Information on an anonymous chatroom may include a name (e.g., 'AAA') set for the anonymous chatroom in which a remitter and a remittee participate.

According to an embodiment, the receipt notification message 1520 may include an interfacing object 1521 to provide detailed information on a remittance transaction. The remitter may request the messaging server or the remittance server for a page displaying the detailed information on the remittance transaction by selecting the interfacing object 1521 included in the receipt notification message 1520.

Figure 16:
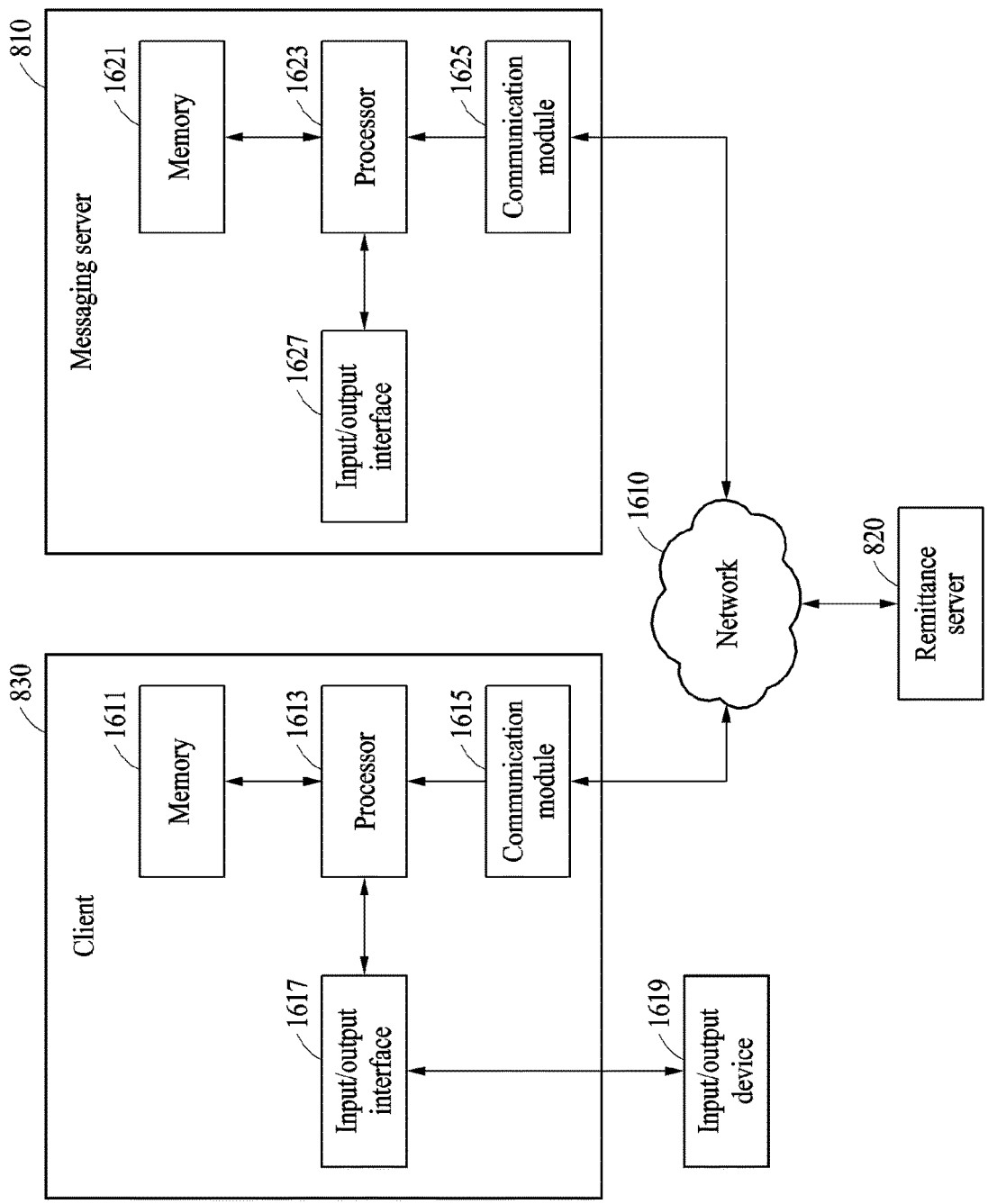
FIG. 16 is another diagram illustrating a hardware configuration of a remittance system, according to an embodiment.

FIG. 16 is another diagram illustrating a hardware configuration of a remittance system, according to an embodiment.

Referring to FIG. 16, the remittance system may include a messaging server 810, a remittance server 820, and a client 830 that are connected to one another through a network 1610. For example, the remittance system illustrated in FIG. 16 may correspond to the remittance system illustrated in FIG. 8 and the messaging server 810, the remittance server 820, and the client 830 that are illustrated in FIG. 16 may respectively correspond to the messaging server 810, the remittance server 820, and the client 830 that are illustrated in FIG. 8. For example, although not illustrated in FIG. 16, the remittance system may further include an authentication server, in which the authentication server, by interoperating with the messaging server 810, may perform an authentication operation to verify a remittance qualification and a receipt qualification.

The client 830 may be a mobile terminal implemented as a computer device. For example, the client 830 may communicate with the messaging server 810, the remittance server 820, and/or other electronic devices through the network 1610 by using a wired or wireless communication method.

The messaging server 810 and the remittance server 820 may be implemented as one or more computer devices providing commands, code, files, content, services, and the like by communicating with the client 830 and/or another server through the network 1610. A communication method may not be limited and may include a communication method using a communication network (e.g., a mobile communication network, wired Internet, wireless Internet, and a broadcasting network) that may be included in the network 1610 and a short-distance wireless communication method between devices. For example, the network 1610 may include one or more networks among networks, such as a PAN, a LAN, a CAN, a MAN, a WAN, a BBN, the Internet, and the like.

According to an embodiment, the messaging server 810 may provide a file for installing an application to the client 830 accessing the messaging server 810 through the network 1610. In this case, the client 830 may install an application (e.g., an instant messaging app) by using a file provided by the messaging server 810. In addition, under control by an OS in the client 830 and one or more programs (e.g., a browser or an installed application) in the client 830, the client 830 may access the messaging server 810 and receive a service or content provided by the messaging server 810. For example, when the client 830 transmits a service request message to the messaging server 810 through the network 1610 by control of an application, the messaging server 810 may transmit code corresponding to the service request message to the client 830 and the client 830 may provide a user with content by composing and displaying a screen according to the code.

According to an embodiment, the client 830 and the messaging server 810 may respectively include memories 1611 and 1621, processors 1613 and 1623, communication modules 1615 and 1625, and input/output interfaces 1617 and 1627.

The processors 1613 and 1623 may perform at least one operation described above with reference to FIGS. 8 to 15B. For example, the processor 1613 may perform at least one operation of the client 830 to use a remittance service, described above with reference to FIGS. 10 and 11, provided by the messaging server 810 by interoperating with the remittance server 820 and the processor 1623 may perform at least one operation providing the remittance service, described above with reference to FIGS. 9, 11, 13, and 14, performed by the messaging server 810 by interoperating with the remittance server 820. The processors 1613 and 1623 may be configured to process commands of a computer program by performing basic arithmetic, logic, and an input/output operation. The commands may be provided to the processors 1613 and 1623 by the memories 1611 and 1621 or the communication modules 1615 and 1625.

The memories 1611 and 1621 may be a computer-readable storage medium, which may be volatile or non-volatile memory. The memories 1611 and 1621 may store information for the remittance service described above with reference to FIGS. 8 to 15B. For example, the memory 1621 may store an account generated corresponding to a subscribing user and the authentication information of the account and mapping information of an account of a user to which a temporary profile is assigned and an identifier of the temporary profile that depends on an anonymous chatroom.

The memory 1611 may include code for an instant messaging app operated by the client 830 by installation in the client 830 of files provided through the network 1610 by the messaging server 810.

The memory 1621 may store a program implementing operations provided by the remittance server, described above with reference to FIGS. 8 to 15B, and performed by the messaging server 810 by interoperating with the remittance server 820.

The communication modules 1615 and 1625 may provide a function for the client 830, the messaging server 810, and the remittance server 820 to communicate with one other through the network 1610 and a function for the client 830, the messaging server 810, and the remittance server 820 to communicate with another electronic device or another server through the network 1610.

For example, a request generated by the processor 1613 of the client 830 according to program code on an instant messaging app stored in a storage medium, such as the memory 1611, may be transmitted to the messaging server 810 through the network 1610 by control of the communication module 1615.

For example, control signals, commands, content, files, and the like provided by control of the processor 1623 of the messaging server 810 may be received by the client 830 or the remittance server 820 through the communication module 1615 of the client 830 after passing through the communication module 1625 and the network 1610.

The input/output interfaces 1617 and 1727 may interface with an input/output device 1619. For example, an input device may include a device, such as a keyboard or a mouse, and an output device may include a device, such as a display for displaying a communication session of an application. In another example, the input/output interface 1617 may interface with a device having input and output functions, such as a touch screen. Specifically, for example, when the processor 1613 of the client 830 processes commands of a computer program loaded in the memory 1611, content or a service screen composed by using data provided by the messaging server 810 may be displayed on a display through the input/output interface 1617. An input received from a user through the input/output device 1619 may be provided in a form processable by the processor 1613 of the client 830 through the input/output interface 1617.

According to an embodiment, the client 830 and the messaging server 810 may include other components than the illustrated ones in FIG. 16. For example, the client 830 may be implemented to include at least a portion of the input/output device 1619 described above or may further include other components, such as transceivers, GPS modules, cameras, various types of sensors, databases, and the like.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operation method of a server providing a remittance service between obfuscated participants of an anonymous chatroom of an instant messaging application, the operation method comprising:
   providing the anonymous chatroom to a first user device associated with a first user and a second user device associated with a second user by:
      assigning, to the first user device and for the anonymous chatroom, a first temporary profile comprising a first temporary name;
      assigning, to the second user device and for the anonymous chatroom, a second temporary profile comprising a second temporary name;
      causing the first user device to display the anonymous chatroom, wherein the anonymous chatroom is configured to associate messages sent from the first user device with the first temporary name; and
      causing the second user device to display the anonymous chatroom, wherein the anonymous chatroom is configured to associate messages sent from the second user device with the second temporary name;
   receiving, from the first user device and via the anonymous chatroom, a remittance request that comprises a selection of the second temporary name;
   identifying, based on the remittance request and based on mappings between temporary profiles and user accounts of the instant messaging application, a first user account corresponding to the first user and a second user account corresponding to the second user;
   verifying, based on authenticating the first user account corresponding to the first user, a remittance qualification of the first user;
   generating remittance transaction information, corresponding to the first temporary profile and the second temporary profile, that permits remittance of an amount corresponding to the remittance request; and
   transmitting, to the second user device, a remittance notification comprising information on the first temporary profile.

2. The operation method of claim 1, wherein the first user account is mapped to the first temporary profile in a mapping table stored in the server, and
   wherein the generating the remittance transaction information comprises:
   generating the remittance transaction information based on the first user account being verified; or
   sending, to the second user device, a remittance qualification request based on the first user account not being verified.

3. The operation method of claim 1, wherein the remittance transaction information is limited to a validity period.

4. The operation method of claim 3, wherein the remittance transaction information comprises data based on the second temporary profile and the second user account.

5. The operation method of claim 1, wherein the receiving the remittance request comprises:
   causing the first user device to display a remittance interface for the remittance request; and
   receiving an input for the remittance request via the remittance interface, wherein the input for the remittance request comprises an indication of a remittance amount.

6. The operation method of claim 5, wherein the assigning, to the second user device and for the anonymous chatroom, the second temporary profile comprises adding, to the mappings between temporary profiles and user accounts, an indication of the second temporary profile and the second user account.

7. The operation method of claim 5, wherein the causing the first user device to display the remittance interface comprises:
preventing the first user device from selecting a third temporary profile that is not associated with authentication information.

8. The operation method of claim 1, further comprising:
generating, for the anonymous chatroom, the first temporary name and the second temporary name.

9. The operation method of claim 1, further comprising:
receiving, from the second user device, a receipt request; and
verifying, based on the receipt request, the remittance transaction information.

10. The operation method of claim 9, further comprising:
based on determining that the second user account is not verified, sending, to the second user device, a request for authentication credentials.

11. The operation method of claim 9, further comprising:
causing display, on the second user device, of an indication of the first temporary name.

12. The operation method of claim 1, further comprising:
causing the remittance transaction information to expire after a validity period.

13. The operation method of claim 1, wherein the remittance transaction information comprises:
an identifier of a remittance transaction corresponding to the remittance request.

14. The operation method of claim 1, wherein
the first user account comprises a profile generated when the first user subscribes for the remittance service, and
the second user account comprises a profile generated when the second user subscribes for the remittance service.

15. A non-transitory computer-readable storage medium storing instructions that, when executed by a processor, cause the processor to perform the operation method of claim 1.

16. A server providing a remittance service between obfuscated participants of an anonymous chatroom of an instant messaging application, the server comprising:
a communication interface configured to communicate with a plurality of user devices; and
at least one processor configured to:
provide the anonymous chatroom to a first user device associated with a first user and a second user device associated with a second user by:
assigning, to the first user device and for the anonymous chatroom, a first temporary profile comprising a first temporary name;
assigning, to the second user device and for the anonymous chatroom, a second temporary profile comprising a second temporary name;
causing the first user device to display the anonymous chatroom, wherein the anonymous chatroom is configured to associate messages sent from the first user device with the first temporary name; and
causing the second user device to display the anonymous chatroom, wherein the anonymous chatroom is configured to associate messages sent from the second user device with the second temporary name;
receive, from the first user device and via the anonymous chatroom, a remittance request that comprises a selection of the second temporary name;
identify, based on the remittance request and based on mappings between temporary profiles and user accounts of the instant messaging application, a first user account corresponding to the first user and a second user account corresponding to the second user;
verify, based on authenticating the first user account corresponding to the first user, a remittance qualification of the first user;
generate remittance transaction information, corresponding to the first temporary profile and the second temporary profile, that permits remittance of an amount corresponding to the remittance request; and
transmit, to the second user device, a remittance notification comprising information on the first temporary profile.

* * * * *